United States Patent
Tadiello et al.

(10) Patent No.: US 11,091,607 B2
(45) Date of Patent: Aug. 17, 2021

(54) REINFORCEMENT MATERIALS, ELASTOMERIC COMPOSITIONS AND TYRES FOR VEHICLES WHEELS COMPRISING THE SAME

(71) Applicant: PIRELLI TYRE S.P.A., Milan (IT)

(72) Inventors: Luciano Tadiello, Milan (IT); Luca Giannini, Milan (IT); Thomas Hanel, Milan (IT); Matteo Redaelli, Milan (IT); Massimiliano D'Arienzo, Milan (IT); Barbara Di Credico, Milan (IT); Roberto Scotti, Milan (IT); Franca Morazzoni, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 291 days.

(21) Appl. No.: 16/343,638

(22) PCT Filed: Oct. 13, 2017

(86) PCT No.: PCT/IB2017/056345
§ 371 (c)(1),
(2) Date: Apr. 19, 2019

(87) PCT Pub. No.: WO2018/078480
PCT Pub. Date: May 3, 2018

(65) Prior Publication Data
US 2019/0270866 A1    Sep. 5, 2019

(30) Foreign Application Priority Data

Oct. 26, 2016  (IT) .................. 102016000108121

(51) Int. Cl.
| C08L 9/00 | (2006.01) |
| B60C 1/00 | (2006.01) |
| C08K 3/36 | (2006.01) |
| C08K 5/5419 | (2006.01) |
| C09C 1/30 | (2006.01) |
| C08L 7/00 | (2006.01) |
| C08K 9/06 | (2006.01) |

(52) U.S. Cl.
CPC ............ *C08L 9/00* (2013.01); *B60C 1/00* (2013.01); *C08K 3/36* (2013.01); *C08K 5/5419* (2013.01); *C08L 7/00* (2013.01); *C09C 1/30* (2013.01); *C09C 1/3081* (2013.01); *C01P 2002/86* (2013.01); *C08K 9/06* (2013.01); *C08L 2312/00* (2013.01); *Y10S 152/905* (2013.01)

(58) Field of Classification Search
CPC .......... C08K 9/06; C08K 3/36; C08K 5/5419; B60C 1/00; Y10S 152/905; C08L 9/00; C08L 2312/00; C09C 1/3081; C01P 2002/86
USPC ....................................................... 523/157
See application file for complete search history.

(56) References Cited

U.S. PATENT DOCUMENTS

| 6,936,669 B2 | 8/2005 | Halasa et al. |
| 8,097,674 B2 | 1/2012 | Hergenrother et al. |
| 8,288,474 B2 | 10/2012 | Hergenrother et al. |
| 8,642,691 B2 | 2/2014 | Hergenrother et al. |
| 8,794,282 B2 | 8/2014 | Hergenrother et al. |
| 9,085,676 B2 | 7/2015 | Papakonstantopoulos et al. |
| 2003/0050408 A1 | 3/2003 | Puhala et al. |
| 2007/0142518 A1* | 6/2007 | Hsu .................. B60C 1/0025 524/262 |
| 2009/0171014 A1 | 7/2009 | Hergenrother et al. |
| 2014/0011924 A1* | 1/2014 | Hergenrother ............ C08L 9/06 524/114 |

FOREIGN PATENT DOCUMENTS

| CN | 105254943 A | 1/2016 |
| EP | 2 202 275 A1 | 6/2010 |
| JP | 2002 080682 A | 3/2002 |
| RU | 2565706 C2 | 10/2015 |
| WO | WO 2011/085199 A2 | 7/2011 |

OTHER PUBLICATIONS

International Search Report form the European Patent Office in corresponding International Application No. PCT/IB2017/056345 dated Feb. 12, 2018.
Written Opinion of the International Searching Authority from the European Patent Office in corresponding International Application No. PCT/IB2017/056345 dated Feb. 12, 2018.
First Russian Office Action dated Nov. 30, 2020, from the Federal Service for Intellectual Property, in counterpart Russian Application No. 2019116009.

* cited by examiner

*Primary Examiner* — Doris L Lee
(74) *Attorney, Agent, or Firm* — Finnegan, Henderson, Farabow, Garrett & Dunner, L.L.P.

(57) ABSTRACT

The present invention relates to new elastomeric materials for the production of tyres for vehicle wheels with good mechanical properties, in particular high moduli associated with low hysteresis values, including new reinforcement materials. Said reinforcement materials are obtainable by derivatising silica—in-situ during the mixing of the elastomeric composition, or previously—with special silanising agents (A) and silsesquioxanes (B), both substituted with reactive alkenyl functionalities.

21 Claims, 7 Drawing Sheets

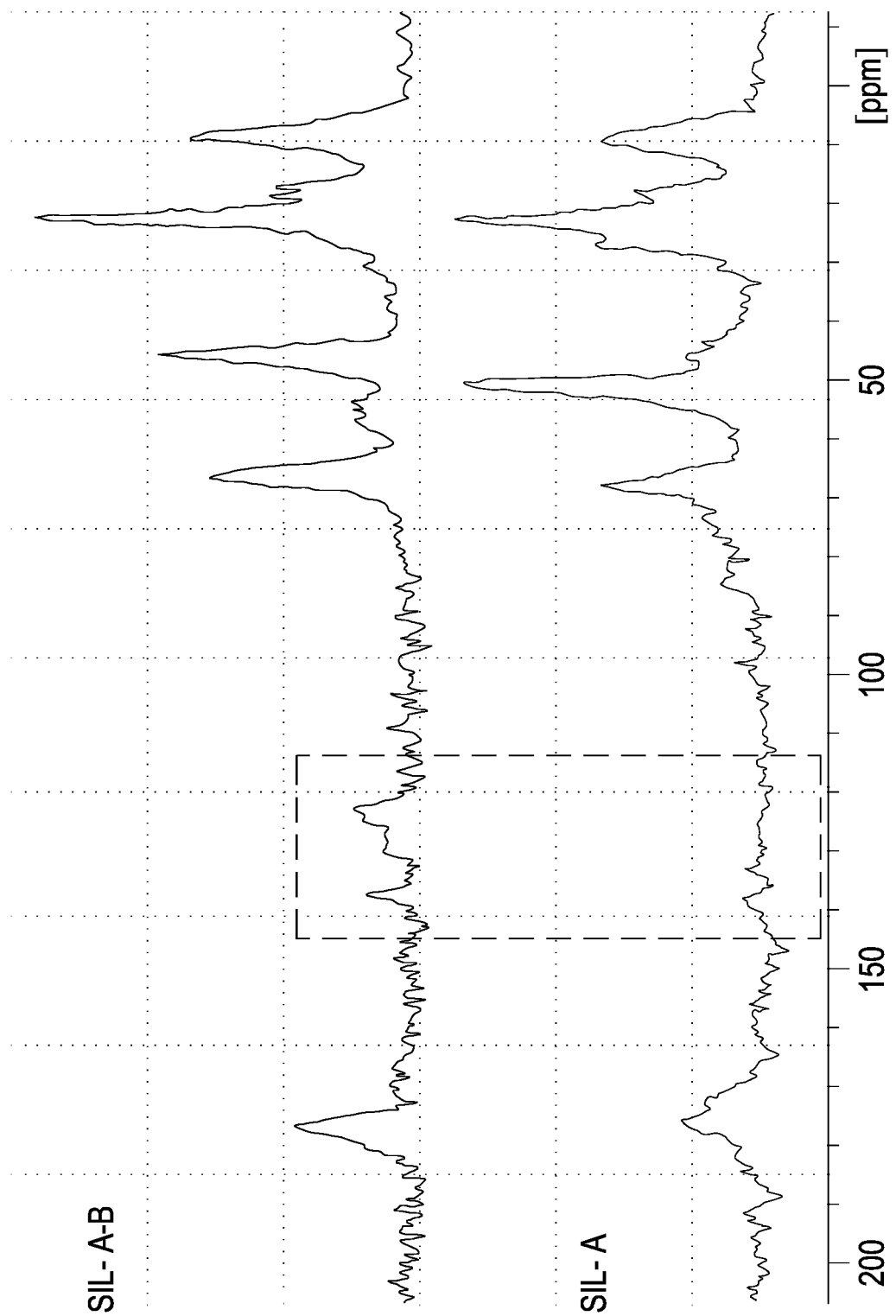

REINFORCEMENT MATERIALS, ELASTOMERIC COMPOSITIONS AND TYRES FOR VEHICLES WHEELS COMPRISING THE SAME

This application is a § 371 national stage entry application based on International Application No. PCT/IB2017/056345, filed Oct. 13, 2017, and claims priority to Italian Patent Application 102016000108121, filed Oct. 26, 2016; the contents of each application is incorporated herein by reference.

FIELD OF THE INVENTION

The present invention relates to new elastomeric materials for the production of tyres for vehicle wheels, characterised by good mechanical properties, in particular by high moduli associated with low hysteresis values. These elastomeric materials comprise new reinforcement materials obtainable by functionalising silica—in-situ during the mixing of the elastomeric composition, or previously—with special silanising agents and silsesquioxanes, both substituted with reactive alkenyl functionalities.

Moreover, the present invention relates to components of tyres and to tyres for vehicle wheels comprising said elastomeric materials, such tyres being provided with improved mechanical properties and lower rolling resistance.

PRIOR ART

In the rubber industry, and more particularly in the tyre industry, it is typical to add reinforcement fillers to the elastomeric materials in order to improve the mechanical properties and the abrasion resistance of the materials obtained therefrom by vulcanisation.

Due to its high reinforcing power, carbon black is the most commonly used filler. However, it imparts a strong hysteresis to the articles, i.e. it increases the dissipated heat under dynamic conditions. In tyres, this results in the undesired increase of the rolling resistance, and overall in higher fuel consumption, in the production of more polluting emissions and higher transport costs. Currently, the majority of vehicle manufacturers increasingly require their suppliers to develop low rolling resistance tyres to reduce consumption.

In order to decrease the hysteresis of elastomeric materials, it is not decisive to use small amounts of carbon black and/or a carbon black with reduced surface area, as doing so compromises the reinforcement activity, thereby worsening the mechanical properties and the resistance abrasion of the final product.

Even the addition of hardening resins is not able to impart the desired balance of high modulus and low hysteresis. Even in this case, in fact, the two properties tend to grow in parallel.

Conversely, by increasing the cross-linking of the materials by incorporation of large amounts of sulphur and zinc oxide it is possible to increase the reinforcement without having a corresponding increase in hysteresis, however at the expense of the strength of the material, which becomes brittle.

An improved balance in this sense was achieved by the use of the so-called "white" reinforcement fillers, especially silica, fillers which may partially or totally replace the carbon black in elastomeric materials and impart a lower hysteresis to them while maintaining sufficient reinforcement.

However, the hysteresis of the elastomeric material filled with silica still remains too high for certain specific applications, for example in tyres with ultra-low rolling resistance (ULRR) or in self-supporting tyres (run-flat) in which significantly lower heat dispersion and rolling resistance are instead required. The elastomeric materials filled with silica and/or silicates do not always show sufficient performance when incorporated in the components of the tyre subjected to strong stress, such as the tread, under-layer, bead protective layers, sidewall, inner layers or sidewall insert (typical of a self-supporting tyre). In the case of beads and bead protective layers, the silica by itself is generally not even able to impart a sufficiently high reinforcement for those specific applications. Traditionally, the compounds for beads and for bead protective layers include carbon black instead of silica, hardening resins of the phenol-formaldehyde type and significant amounts of sulphur and zinc oxide which, by vulcanisation, lead to a pronounced cross-linking of the material and high moduli. However, the system hysteresis also increases proportionally.

A further problem of known fillers, in particular silica and carbon black, is represented by the fact that under dynamic conditions, i.e. when the elastomeric material filled with silica and/or carbon black and vulcanised is stressed in the tyre in use, a partial breakdown of the dispersed filler can occur that adversely affects the mechanical properties. This phenomenon occurs with a reduction of the dynamic modulus that is more marked when the deformation to which the elastomeric material is subjected is higher. This phenomenon is known as Payne effect. In practical terms, just when the tyre is most stressed and then just when the elastomeric material should show the best mechanical performance, the reinforcing effect of the filler is however lacking.

In order to improve the dispersion and compatibilisation of silica, silanising agents are commonly used in elastomeric materials, such as for example bis-(3-triethoxysilyl)propyl tetrasulphide and disulphide, (3-triethoxysilyl)propyl mercapto silane or bis-(3-triethoxysilyl)propyl disulphide, capable of reacting with the hydroxyl groups of the silica and interacting through the sulfhydryl portion with the elastomer, with results, however, not always optimal.

Alternative fillers have also been studied, based on silicate fibres of nanometric dimensions such as sepiolites which, while unexpectedly improving the drivability of cars subjected to high operating speeds and/or extreme driving conditions, seem to not overcome the drawbacks of excessive rolling resistance and less support at higher deformations of silica.

Among the possible innovative fillers being studied to improve the properties of elastomeric materials are the so-called inorganic-organic "hybrid fillers", such as for example substituted silsesquioxanes, particularly the so-called Polyhedral Oligomeric SilSesquioxanes (POSS).

These compounds are characterised by an inorganic core, consisting of an oxygen- and silicon-based cage structure, functionalised with organic substituents adapted to interact with the polymer matrix.

Silsesquioxanes substituted with amino or alkoxy functionalities have been incorporated into elastomeric materials for tyres, see, for example, the alkoxy or aminoalkoxy silsesquioxanes described in U.S. Pat. Nos. 8,288,474, 8,097,674, as silica compatibilising agents with reduced emissions of volatile organic compounds (VOC) or the aminoalkoxy silsesquioxanes described in U.S. Pat. Nos. 8,794,282, 8,642,691 and WO2016109625, such as tackifying agents in compounds in contact with metallic materials.

Silsesquioxanes preferably substituted with mercapto groups in the presence of silanising agents of silica, also with polysulfhydryl functionality, capable of participating in the typical cross-linking of sulphur vulcanisation system, are described in U.S. Pat. No. 9,085,676 to increase the mechanical reinforcement in elastomeric materials for tyres comprising silica. The only example given describes the preparation of an elastomeric composition in which the silanising agent [bis(triethoxysilylpropyl)polysulphide], silica and silsesquioxane (mercapto substituted octapropyl-silsesquioxane) are mixed with the elastomer and other additives in the first non-productive step.

The elastomeric material thus obtained, after vulcanisation has, with respect to the comparison material, not including the silsesquioxane, a not particularly considerable increase of the modulus, despite the high affinity of sulfhydryl reactive groups for the traditional sulphur-based vulcanisation system used therein.

Silsesquioxanes substituted with reactive alkenyl functionalities are reported to be quite poor reinforcement materials when substituted or added to silica, as described for example on page 176, in section "Results and discussion" of the article Materials Science Forum, Vol. 714, (2012) 175-181.

This article describes the use of caged silsesquioxanes substituted with reactive vinyl or methacrylic functions as modifying agents in elastomeric materials including silica and some data of mechanical static and dynamic properties after cross-linking are reported. In the study, only conventional silica not treated with silanising agents is used. Table 3 shows that the incorporation of these silsesquioxanes in elastomeric materials including silica leads to an increase in hysteresis (see values $\Delta W1/W1$ and $\Delta W5/W5$).

The article Nanomaterials vol. 2013, ID 674237 (http://dx.doi.org/10.1155/2013/674237) describes the preparation and characterisation of hybrid fillers obtainable by a first functionalization of silica with isocyanate- or amino-alkoxysilanes followed by treatment with methacryl-POSS (see Table 1). This article does not describe the incorporation of such fillers in elastomeric matrices, nor does it provide data on their possible properties.

In conclusion, there remains a need to find new fillers, possibly more effective, that with preferably smaller amounts compared to silica, allow a further improvement of the balance between reinforcement and hysteresis of materials, ideally with control of the Payne effect as the modulus increases.

SUMMARY OF THE INVENTION

The Applicant has set itself the problem of how to improve the mechanical performance and at the same time further reduce the hysteresis of the current elastomeric materials filled with silica to make tyres with minimal rolling resistance (ULRR tyres), usable in particularly demanding conditions, or of wider applicability, such as in summer tyres for cars, for all seasons or winter, as well as in light transport tyres or tyres for heavy load vehicle wheels. The objective of the Applicant appeared particularly challenging because, generally, in conventional elastomeric materials including standard reinforcement systems such as carbon black or silica, these properties grow at the same pace, i.e. an increase in the module normally corresponds to an increase of hysteresis and vice versa.

The Applicant has also set the objective of minimising the deterioration of mechanical properties at high deformations typical of elastomeric materials for tyres filled with silica and/or carbon black while maintaining the other important properties such as reduced rolling resistance, rigidity, abrasion resistance and, in driving the vehicle, handling and comfort.

The Applicant has found that by reacting silica—in situ during the mixing of the elastomeric composition or before—with specific silanising agents (A) and silsesquioxanes (B), both characterised by the presence of particular reactive alkenyl substituents, elastomeric materials for tyres with surprisingly advantageous properties are obtained, in particular, very high moduli are imparted to them with equal or even decreased hysteresis with respect to corresponding elastomeric materials comprising only conventional silica or conventional silica treated respectively with silanising agents (A) alone or with silsesquioxanes (B) alone.

Achieving this balance of properties, i.e. high modulus and low hysteresis, is quite unexpected in the light of previous evidence and teachings of the prior art.

The selection of these specific agents (A) and (B), to derivatise silica, has allowed obtaining significantly more effective reinforcement systems of silica itself, i.e. systems that with the same filler provide significantly superior moduli to the elastomeric materials that incorporate them or alternatively that with smaller amounts can impart comparable moduli while maintaining or reducing hysteresis, respectively.

The Applicant, without wishing to be bound to any particular theory, believes that the interaction between silica, silanising agent (A) and silsesquioxane (B) originates a reactive pattern, due to the presence of the active alkenyl groups of the silanising agent and of silsesquioxane. This reactive pattern, in the presence of a radical initiator, would be capable of effectively interacting with the elastomer, leading to optimal cross-linking, capable of trapping the rubber and decisively affecting the properties thereof.

In the final vulcanised elastomeric composition, silsesquioxanes, in the pattern, would act as mediators between the silica particles, preventing with their presence the re-aggregation thereof, that would be at the origin of the Payne effect.

A first aspect of the present invention therefore is a process for the preparation of derivatised silica (SIL-A-B) which comprises
providing silanised silica (SIL-A)
said silanised silica being obtainable according to a process which preferably comprises
providing silica (C)
providing at least one silanising agent of formula $$(R1)_3Si—X \quad (A)$$

wherein
R1, the same or different from each other, are selected from R2, OR2, OSi(OR2)$_3$, OH, halogen and group X, provided that at least one R1 is equal to OR2, OSi(OR2)$_3$, OH or halogen;
R2, the same or different from each other, are selected from linear or branched alkyl with 1 to 20 carbon atoms, cycloalkyl with 3 to 20 carbon atoms, alkylaryl with 7 to 20 carbon atoms and aryl with 6 to 20 carbon atoms;
group X is a reactive alkenyl group selected from X1, X2 and X3, wherein

| X1 | is a group | —R3—C(Wa) = C(R4)R4 |
|----|------------|---------------------|
| X2 | is a group | —R3—C(R4) = C(Wa)R4 |
| X3 | is a group | —R3—Wb—C(R4) = C(R4)R4 | wherein R3 may be absent or may be a linear or branched alkylene group with 1 to 10 carbon atoms, optionally unsaturated, Wa may be H or an electron-attractor group selected from COOR4, CONR4R4, $NO_2$, CN, COR4, $SO_3$R4, NR4R4, halogen, Wb is a group selected from —O—CO—, —COO—, —NR4-CO—, —CO—NR4-, —SO—, —$SO_2$—, —CO—, R4, the same or different from each other, can be H or be selected from the groups R2 defined above;

placing the silica (C), the silanising agent (A) and possibly an acid catalyst in contact, preferably in an organic solvent, allowing to react until the silanised silica (SIL-A) is obtained, separating the silanised silica (SIL-A) from the reaction medium, and placing the silanised silica (SIL-A) in contact, preferably in an organic solvent, with at least one compound of formula (B) selected from the silsesquioxanes of formula (B1), (B2), the compounds of formula (B3) and mixtures thereof, $(RSiO_{1.5})_n$ (B1)

$(RSiO_{1.5})_x[RSi(OR4)O]_y$ (B2)

$[RSi(OH)O]_{3-4}$ (B3)

wherein n is an even number from 4 to 24, x is an integer from 3 to 23, y is an integer from 1 to 6 and x+y≤24, groups R, the same or different from each other, are selected from R2 and X, provided that at least one of groups R is a group X, wherein R2, R4 and X are as defined above;

adding at least one radical initiator (D), allowing to react until a derivatised silica (SIL-A-B) is obtained, preferably separating the derivatised silica (SIL-A-B) from the reaction medium.

A second aspect of the present invention is a derivatised silica (SIL-A-B) obtainable by the process defined above.

A third aspect of the present invention is an elastomeric composition comprising at least 100 phr of at least one solid diene elastomeric polymer (E), and at least 3 phr of a derivatised silica (SIL-A-B) according to the second aspect of the invention.

A fourth aspect of the present invention is an elastomeric composition comprising at least 100 phr of at least one solid diene elastomeric polymer (E), at least 5 phr of silica (C), at least 0.3 phr of a silanising agent of formula $(R1)_3Si—X$ (A), and at least 0.5 phr of a compound of formula (B) as defined above.

A fifth aspect of the present invention is a vulcanisable elastomeric composition for a tyre for vehicle wheels comprising an elastomeric composition according to the third or the fourth aspect of the present invention, and moreover at least 0.1 phr of at least one vulcanising agent (F), and preferably 0.5 to 10 phr of at least one activating agent for the vulcanisation (F1); and/or 0.1 to 10 phr of at least one accelerant for the vulcanisation (F2), and/or 0.05 to 2 phr of at least one retardant for the vulcanisation (F3).

A sixth aspect of the present invention is a tyre component either green or at least partially vulcanised for vehicle wheels, comprising a vulcanisable elastomeric composition according to the fifth aspect of the invention or a vulcanised elastomeric composition obtainable by vulcanisation of said vulcanisable elastomeric composition.

A seventh aspect of the present invention is a tyre for vehicle wheels comprising at least one component according to the sixth aspect of the invention.

DETAILED DESCRIPTION OF THE INVENTION

For the purposes of the present description and of the following claims, the term "phr" means the parts by weight of a given component of the elastomeric composition by 100 parts by weight of the diene elastomeric polymer (parts per hundreds of rubber).

A first aspect of the present invention is a process for the preparation of derivatised silica (SIL-A-B), which includes the reaction of a silanised silica (SIL-A) with a compound of formula (B).

Preferably, said silanised silica (SIL-A) is obtained by reacting the silica (C) with a silanising agent (A). The process according to the present invention is characterised by one or more of the following preferred aspects taken alone or in combination with one another.

The term "silica" in the present context means conventional silica and silicates.

The silica (C) used in the present process may be a standard silica commonly used as a reinforcement filler of elastomeric materials, preferably a silica selected from amorphous silica of natural origin, precipitated amorphous silica, pyrogenic silica, mesoporous silica with controlled morphology obtained with micellar templates as described for example in Polymer, Volume 55, 2014, 1497-1506.

Preferably, silica is a precipitated amorphous silica, more preferably a nanometric-sized silica with high hydrophilicity, i.e. a high density of OH groups.

As an alternative to conventional silica, silicate may be used, in particular phyllosilicates, which have OH groups reactive against silanes such as sepiolite, modified sepiolite, such as by acid treatment, palygorskite (also known as attapulgite), bentonite, montmorillonite, kaolinite, halloysite and wollastonite.

Commercial Examples of silicas and silicates usable in the present process are Zeosil 1165 MP, Zeosil 1115 MP, Zeosil 1200 MP, Zeosil 1085GR, Zeosil 115 GR, Zeosil 165 GR, Zeosil 195 GR by Solvay, Newsil HD 115 MP, Newsil HD 165 MP, Newsil HD 200 MP by Quechen, Ultrasil 5000 GR, Ultrasil 6000 GR, Ultrasil 7000 GR, Ultrasil 9000 GR, Ultrasil VN2 GR, Ultrasil VN3, Ultrasil VN3 GR, Aerosil 150, Aerosil 200 by Evonik, Perkasil GT 3000, Perkasil KS 300, Perkasil KS 408 by Grace, Zeopol 8745 by Huber, Ebrosil H180, Ebrosil GR and Ebrosil S-125 by IQESIL, Celtix by World Minerals, Pangel S9, Pangel B5 and Pansil 100 by Tolsa, Dellite HPS by Laviosa, Laponite RD by Rockwood.

Silica (C) may possibly be obtained from an amorphous silica precursor.

By "precursor compound of amorphous silica" it is meant a compound or a mixture of compounds able to generate amorphous silica by hydrolysis in situ, by heating and/or in the presence of acids or bases.

Preferably, said precursor of amorphous silica is selected from:

I) the alkaline salts of silicic acid, of formula $$M_2O \cdot nSiO_2 \quad (I)$$

where M=Na, K, Li and where n is comprised between 0.5 and 4, preferably n=0.5 or 1 or 3 and M=Na or K, which generate amorphous silica in the presence of acids, II) the tetra-alkyl derivatives of silicic acid (or tetra-alkoxy-silanes) of formula $$(R5O)_4Si \quad (II)$$

wherein groups R5, the same or different from each other, represent C1-C6 alkyls,
which generate amorphous silica in the presence of water and, preferably, acids or bases, III) the halosilanes of formula $$SiY_4 \text{ or } (R5O)_3SiY \text{ or } (R5O)_2SiY_2 \text{ or } (R5O)SiY_3 \quad (III)$$

wherein groups R5, the same or different from each other, represent C1-C6 alkyls, and Y, the same or different from each other, are selected from chlorine, bromine and iodine, preferably chlorine, which generate amorphous silica in the presence of water and, possibly, bases.

The silanising agent of formula (A) is characterised by the presence of at least one reactive alkenyl functionality (group X) and at least one silane substituent group capable, after possible hydrolysis, of reacting with the silanols present on the surface of the silica.

The alkenyl group X is defined reactive, that is, capable of reacting in the reaction conditions described below. Generally, the reactive alkenyl group includes at least one double bond, preferably at least one double bond activated by the presence of an electron-attractor group (W).

In particular, preferred silanising agents of formula $$(R1)_3Si-X \quad (A)$$

are the compounds of formula (A) defined above, wherein
R1, the same or different from each other, are selected from R2, OR2, OSi(OR2)$_3$, and halogen, provided that at least one R1 is equal to OR2, OSi(OR2)$_3$ or halogen, or
R1, the same or different from each other, are selected from R2, OR2, OSi(OR2)$_3$ and halogen, provided that at least one R1 is equal to OR2, OSi(OR2)$_3$ or halogen and R2 is a linear or branched alkyl with 1 to 5 carbon atoms, more preferably 1 to 3 carbon atoms, or
the three groups R1 are all equal to OR2, preferably equal to each other, or
the three groups R1 are all equal to halogen, preferably equal to each other, more preferably said halogen is chlorine, or
group X is a reactive alkenyl group X1 or X2 or X3, as defined above, wherein R3 is an alkylene with 2 to 5 carbon atoms (such as —CH$_2$—CH$_2$— or —CH$_2$—CH$_2$—CH$_2$—), or
group X is a reactive alkenyl group X1 or X2 or X3, as defined above, wherein Wb is a group —O—CO—, or
group X is a reactive alkenyl group X1 or X2 or X3, as defined above, wherein R4 is selected from hydrogen and methyl, or
group X is a reactive alkenyl group X3, i.e. a group —R3-Wb-C(R4)=C(R4)R4 wherein R3 is an alkylene with 2 to 5 carbon atoms, more preferably with 3 carbon atoms (such as —CH$_2$—CH$_2$—CH$_2$—), Wb is a group —O—CO— and R4 the same or different from each other are selected from H and alkyl with 1 to 3 carbon atoms, or
group X is a group X3, i.e. a group —R3-Wb-C(R4)=CH$_2$, wherein R3 is an alkylene with 2 to 5 carbon atoms, more preferably with 3 carbon atoms, Wb is a group —O—CO— and R4 is selected from hydrogen and methyl.

Preferably, the silanising agent is a compound of formula $$(R1)_3Si-X \quad (A)$$

wherein
R1, the same or different from each other, are selected from R2, OR2, OSi(OR2)$_3$, and halogen, provided that at least one R1 is equal to OR2, OSi(OR2)$_3$ or halogen,
R2 is a linear or branched alkyl with 1 to 3 carbon atoms,
group X is a reactive alkylene group X3, i.e. a group —R3-Wb-C(R4)=C(R4)R4, wherein R3 is an alkylene with 2 to 5 carbon atoms, more preferably with 3 carbon atoms,
WB is a group —O—CO— and
R4, the same or different from each other, are selected from H and methyl.

Preferably, the silanising agent is a compound of formula $$(R1)_3Si-X \quad (A)$$

wherein
R1, the same or different from each other, are selected from R2 and OR2, and R2 is a linear or branched alkyl with 1 to 3 carbon atoms;
group X is a reactive alkenyl group X3 as defined above, wherein R3 is an alkylene with 2 to 5 carbon atoms, Wb is a group —O—CO— and R4 the same or different from each other are selected from H and alkyl with 1 to 3 carbon atoms.

Examples of suitable silanising agents are 3-3-(trimethoxysilyl)propyl acrylate, 3-[diethoxy(methyl)silyl]propyl methacrylate, 3-(trimethoxysilyl)propyl methacrylate (TMMS), 3-[tris(trimethoxysilyl)silyl]propyl methacrylate, 3-[dimethoxy(methyl)silyl]propyl methacrylate, 3-(methoxydimethylsilyl)propyl acrylate, 3-(triethoxysilil) propyl methacrylate (or triethoxypropylmethacrylsilane TEMS), 3-(acryloxypropyl)trichlorosilane, 3-acryloxypropyl)methyldichlorosilane.

Commercial examples of suitable silanising agents are JH-O1741, marketed by Jingzhou Jianghan Fine Chemical Co LTD; Dynasylan MEMO, Dynasylan 6490, 6498 and 6598 marketed by Evonik; Silquest A151, Silquest A171, Silquest A174 marketed by Momentive.

The compound of formula (B) is selected from the silsesquioxanes of formula B1, B2, compounds B3 and mixtures thereof.

The term "silsesquioxane" in the present description means the product of formula B1 with closed cage, and the products of formula B2 with open cage in which the typical stoichiometry in terms of
Si:O ratio is substantially maintained, at least in part, around 1:1.5 of these compounds.

Preferably, compound (B) is a closed cage silsesquioxane of formula B1

$$(RSiO_{1.5})_n \quad (B1)$$

Generally, closed cage silsesquioxanes (B1) are marketed in the form of mixtures of two or more silsesquioxanes, mixtures that are suitable for the uses and purposes of the present invention.

Preferably, compound (B) is a silsesquioxane of formula B1 wherein n is an even number from 6 to 12, more preferably from 6 or 8, or mixtures thereof.

Preferably, compound (B) is a silsesquioxane of formula B1 wherein at least one group R is a reactive group X, wherein X is X3, i.e. a group —R3-Wb-C(R4)=C(R4)R4).

Preferably, at least two of the groups R are reactive groups X, the same or different from each other.

Preferably, at least two of the groups R are reactive groups X equal to each other.

Preferably, at least two of the groups R are reactive groups X3.

Preferably, all groups R are reactive groups X, the same or different from each other.

Preferably, all groups R are reactive groups X equal to each other.

Preferably, all groups R are reactive groups X3.

Preferably, the reactive group X is X3 and Wb is —O—CO—

Preferably, the reactive group X is X3, i.e. —R3-Wb-C(R4)=C(R4)R4), wherein R3=linear or branched alkylene with 2 to 5 carbon atoms, preferably with 3 carbon atoms, and Wb is —O—CO—.

Preferably, the reactive group X is X3, i.e. —R3-Wb-C(R4)=C(R4)R4), wherein R3=linear alkylene with 2 to 5 carbon atoms, preferably with 3 carbon atoms, such as —CH$_2$—CH$_2$—CH$_2$—, Wb is —O—CO— and R4, the same or different from each other are selected from H and linear or branched alkyl with 1 to 5 carbon atoms.

Preferably, the reactive group X is X3, i.e. —R3-Wb-C(R4)=C(R4)R4), wherein R3=linear alkylene with 3 carbon atoms, Wb is —O—CO— and R4=is selected from H and methyl.

Preferably, all groups R are reactive groups X3 and X3 is a group —(CH$_2$)$_3$—OCO—CH=CH$_2$ or —(CH$_2$)$_3$—OCO—C(CH$_3$)=CH$_2$.

Preferably, compound (B) is a silsesquioxane of formula B1 wherein n is an even number from 6 to 12, more preferably 6 or 8, and mixtures thereof and all groups R are reactive groups X3.

Preferably, compound (B) is a silsesquioxane of formula B1 wherein n is an even number from 6 to 12, more preferably 6 or 8, and mixtures thereof and all groups R are reactive groups X3, wherein R3 is an alkylene with 2 to 5 carbon atoms, Wb is a group —O—CO— and R4 the same or different from each other are selected from H and alkyl with 1 to 3 carbon atoms.

Preferably, compound (B) is a silsesquioxane of formula B1 wherein n is an even number from 6 to 12, more preferably 6 or 8, and mixtures thereof and all groups R are reactive groups X3, wherein X3 is a group —(CH$_2$)$_3$—OCO—CH=CH$_2$ or —(CH$_2$)$_3$—OCO—C(CH$_3$)=CH$_2$.

Preferably, compound (B) is a silsesquioxane of formula B1 wherein n is an even number from 6 to 12 and wherein all groups R are reactive groups X1 as defined above, wherein R3 is absent, Wa and R4 are all H.

Preferred examples of closed cage silsesquioxanes of formula B1

(RSiO$_{1.5}$)$_n$ (B1)

are shown herein:

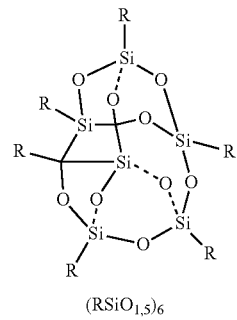

(RSiO$_{1.5}$)$_6$  B1a

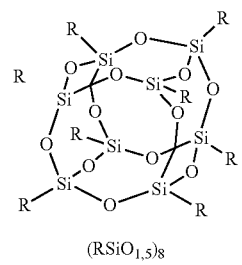

(RSiO$_{1.5}$)$_8$  B1b

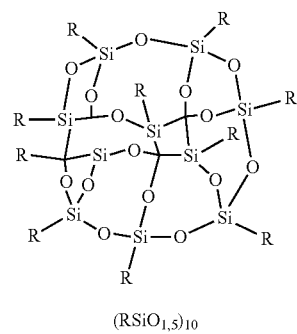

(RSiO$_{1.5}$)$_{10}$  B1c

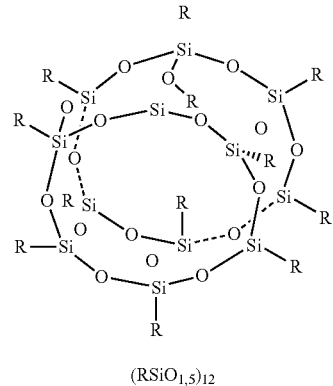

(RSiO$_{1.5}$)$_{12}$  B1d wherein at least one R preferably all R, are reactive groups X, more preferably are reactive groups X3.

Examples of preferred closed cage silsesquioxanes are: octaacryl silsesquioxane (C$_6$H$_9$O$_2$)$_n$(SiO$_{1.5}$)$_n$, where n=8, 10 or 12, octaglicydil silsesquioxane (C$_6$H$_{11}$O$_2$)$_n$(SiO$_{1.5}$)$_n$, where n=8, 10 or 12, octavinyl silsesquioxane C$_{16}$H$_{24}$O$_{12}$Si$_8$ vinylisobutyl silsesquioxane, methacryloisobutyl silsesquioxane, octamethacryl silsesquioxane, octamethacrylpropyl silsesquioxane.

Particularly preferred are silsesquioxanes named MA0735 (methacrylate) of formula

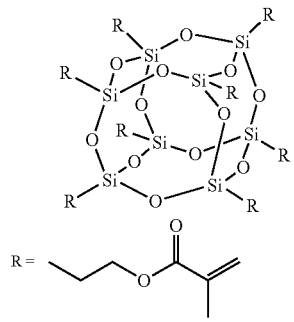

the corresponding acrylate MA0736 and octavinyl silsesquioxane OL1170 of formula:

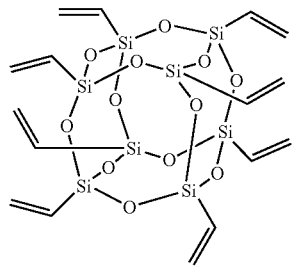 [SMILES: C=C[Si]12O[Si]3(C=C)O[Si]4(C=C)O[Si](C=C)(O1)O[Si]1(C=C)O[Si](C=C)(O2)O[Si](C=C)(O3)O[Si](C=C)(O4)O1]

(R=X1 vinyl, i.e. —R3-C(Wa)=(R4)R4 where R3 is absent, Wa and R4=H),
marketed by Hybrid Plastic.

Alternatively, compound (B) may be an open cage silsesquioxane of formula (B2)

$(RSiO_{1.5})_x[RSi(OR4)O]_y$  (B2)

wherein preferably x is an integer between 4 and 12, y is an integer between 1 and 5 and x+y≤17, more preferably x+y≤14.

The open cage silsesquioxanes of formula (B2) may include mixtures of open cage silsesquioxanes, characterised by different values of x and/or y.

In the open cage silsesquioxane of formula (B2), at least one of groups R is a reactive group X as defined above, preferably is a group X3, i.e. a group —R3-Wb-C(R4)=C(R4)R4).

Preferably, the reactive group X is a group X3, i.e. a group —R3-Wb-C(R4)=C(R4)R4), wherein R3 is a linear or branched alkylene with 2 to 4 carbon atoms and Wb is —O—CO—.

Preferably, the reactive group X is a group X3, i.e. a group —R3-Wb-C(R4)=C(R4)R4), R3 is a linear alkylene with 2 to 4 carbon atoms, Wb is —O—CO—, and R4, the same or different from each other are selected from H and linear or branched alkyl with 1 to 5 carbon atoms.

Preferably, the reactive group X is a group X3, i.e. a group —R3-Wb-C(R4)=C(R4)R4, R3 is a linear alkylene with 3 carbon atoms, Wb is —O—CO— and R4 are selected from H and methyl.

Preferably, in the open cage silsesquioxane of formula (B2), all groups R are reactive groups X3 and X3 is selected from —(CH$_2$)$_3$—OCO—CH=CH$_2$ or —(CH$_2$)$_3$—OCO—C(CH$_3$)=CH$_2$.

The open cage silsesquioxane of formula (B2) may be terminated with hydrogen (OR4=OH), alternatively it may be terminated with alkoxy (OR4) wherein R4 is linear or branched alkyl with 1 to 20 carbon atoms, cycloalkyl from 3 to 20 carbon atoms, alkylaryl with 7 to 20 carbon atoms, and aryl with 6 to 20 carbon atoms, preferably an alkyl with 1 to 10 carbon atoms, more preferably 1 to 5 carbon atoms.

Examples of open cage silsesquioxanes terminated with hydrogen (OR4=OH) are:

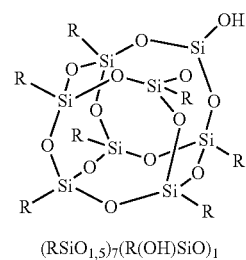

(RSiO$_{1.5}$)$_7$(R(OH)SiO)$_1$    B2a

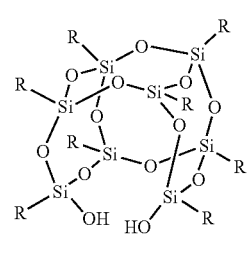

(RSiO$_{1.5}$)$_6$(R(OH)SiO)$_2$    B2b

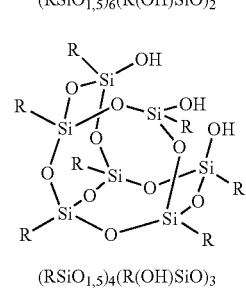

(RSiO$_{1.5}$)$_4$(R(OH)SiO)$_3$    B2c

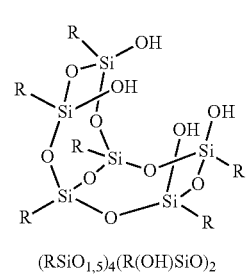

(RSiO$_{1.5}$)$_4$(R(OH)SiO)$_2$    B2d

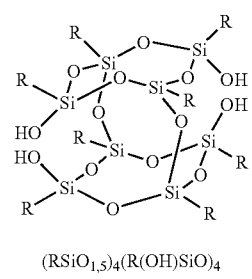

(RSiO$_{1.5}$)$_4$(R(OH)SiO)$_4$    B2e

Examples of open cage silsesquioxanes terminated with alkoxy (OR4, R4=alkyl) are those described in U.S. Pat. Nos. 8,288,474 and 8,097,674.

Alternatively, compound (B) may be a fragment of silsesquioxane of formula B3

 (B3)

that can be represented by the following formulas

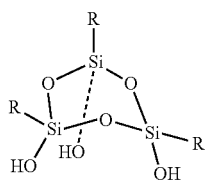 B3a

[RSi(OH)O]$_3$

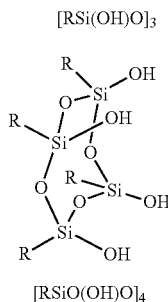 B3b

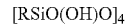

The process for preparing the derivatised silica according to the present invention includes the reaction of a silanised silica (SIL-A) with compound (B) to give the derivatised silica according to the present invention (SIL-A-B).

The silanised silica (SIL-A) is preferably obtainable by reacting the silica (C) with a silanising agent (A) as defined above.

The reaction between silica (C) and silanising agent (A) is preferably carried out in an organic solvent, possibly in a mixture with water, said organic solvent being preferably selected from aliphatic hydrocarbons, such as heptane or cyclohexane, aromatic hydrocarbons, such as toluene or xylene, ethers, such as tetrahydrofuran or dimethoxyethane, dipolar aprotic solvents, such as dimethylformamide or dimethyl sulfoxide, ketones, such as acetone or methyl ethyl ketone, chlorinated solvents, such as methylene chloride or dichloroethane, or alcohols, such as methanol, ethanol, 1-propanol, 2-propanol or butanol, or mixtures thereof. Preferably, said organic solvent is selected from toluene and one or more alcohols, such as methanol, ethanol, possibly mixed with water, preferably it is toluene.

The solvent or mixture of reaction solvents is generally used in a volumetric ratio with respect to the weight of silica of between 10:1 and 1:10 (ml/g), more preferably around 4:1, or in a lower ratio, such as 2:1, 1:1 or less, for reactions on an industrial scale.

Preferably, the suspension of silica (C) in the presence of the silanising agent (A) and optionally of the acid catalyst, is carried out under stirring, preferably at a temperature of between 20° C. and the boiling temperature of the solvent at ambient pressure, more preferably at room temperature (25° C.).

Generally, the silanisation reaction reaches completion in a time of between 2 and 48 hours. In the silanisation reaction, the silanising agent (A) is preferably used in a weight ratio, with respect to silica (C), of between 0.05:1 and 1:1, preferably between 0.1:1 and 1:1, more preferably between 0.2:1 and 0.5:1.

The reaction between silica (C) and the silanising agent (A) takes place possibly in the presence of an acid catalyst.

The acid catalyst is preferably selected from acetic, formic, propionic, citric, acetylsalicylic, thioglycolic, salicylic, chloroacetic, fluoroacetic and trifluoroacetic acid.

Preferably, the acid catalyst is trifluoroacetic acid.

Preferably, the acid catalyst is used in a weight ratio, with respect to silica, of between 0.001:1 and 0.2:1, preferably between 0.005:1 and 0.15:1, more preferably around 0.10:1 (g catalyst/g silica).

Preferably, in the silanisation reaction, the silanising agent (A) is first dispersed in the solvent and silica (C) and optionally, the acid catalyst are added to the solution, leaving under stirring at room temperature for 48 hours.

Alternatively, the man skilled in the art will be able to identify other addition modes, for example reverse the order of addition of reagents, i.e. starting by suspending the silica (C) in the selected solvent and then adding the silanising agent (A) and optionally the catalyst to the suspension, under strong stirring.

At the end of the silanisation reaction, the solvent is preferably removed, generally by filtration or evaporation, and the silanised silica (SIL-A) is preferably dried, preferably hot, optionally under vacuum.

The silanised silica (SIL-A) thus obtained can be characterized through NMR spectroscopy, preferably with $^{13}$C NMR and $^{29}$Si NMR, as described in the experimental part.

The silanised silica (SIL-A) thus prepared and preferably isolated may be subjected to the subsequent derivatisation reaction with compound (B).

The silanised silica (SIL-A) may also be prepared using alternative procedures within the reach of the man skilled in the art. However, irrespective of the method of preparation of the silanised silica SIL-A, the derivatisation thereof by reaction with compound (B) to give the derivatised silica (SIL-A-B) falls within the scope of the present invention.

Preferably, the derivatisation reaction with compound (B) is carried out in a solvent or mixture of solvents as defined above, preferably in toluene, preferably under stirring and preferably at a temperature of between 20° C. and the boiling temperature of the solvent at ambient pressure, more preferably at the boiling temperature of the solvent at ambient pressure.

The solvent or mixture of reaction solvents is generally used in a volumetric ratio with respect to the weight of silanised silica SIL-A of between 10:1 and 1:10, more preferably around 4:1 (ml/g), or in a lower ratio, such as 2:1, 1:1 or less, for reactions on an industrial scale.

Generally, the derivatisation reaction with compound (B) reaches completion in a time between 20 minutes and 4 hours.

In the derivatisation reaction of the process according to the present invention, compound (B) is generally used in a weight ratio, with respect to the silanised silica (SIL-A), of between 0.03:1 and 1:1, preferably between 0.1:1 and 0.5:1, more preferably around 0.25:1.

The derivatisation reaction of the present process between the silanised silica (SIL-A) and compound (B) takes place in the presence of a radical initiator (D).

Preferably, the radical initiator (D) is selected from the class of organic peroxide initiators.

Non-limiting examples of suitable organic peroxide vulcanising agents are dicumylperoxide; di-t-butylperoxide; benzyl peroxide; 2,5-bis(t-butyl peroxy)-2,5-dimethyl hexane; 1,1-di-t-butyl peroxy-3,3,5-trimethyl cyclohexane; 2,5-dimethyl-2,5-dimethyl-2,5-di(t-butyl peroxy)hexino-3; p-chlorobenzyl peroxide; 4,4-di-(terz-butylperoxy) valerate, 2,4-dichlorobenzyl peroxide; 2,2-bis(t-butyl peroxy)-butane; 2,5-bis(t-butyl peroxy)-2,5-dimethyl hexane; and 2,5-dimethyl-2,5-di(t-butyl peroxy)hexane and mixtures thereof.

Alternatively, the radical initiator (D) is selected from the class of azo compounds (organic compounds characterised by the functional group —N═N—) such as 4,4-azobis(4-cianovaleric) acid, 1,1-azobis(cyclohexanecarbonitrile) acid and 2,2'-azobisisobutyrronitrile (AIBN).

Preferably, the radical initiator includes dicumylperoxide (DCP) or 2,5-bis(t-butylperoxy)-2,5-dimethyl hexane optionally mixed with other radical initiators.

Preferably, the radical initiator is used in a weight ratio, with respect to the silanised silica (SUM, of between 0.001:1 and 0.01:1, preferably around 0.002:1 (g initiator/g silica).

At the end of the derivatisation reaction, the solvent is preferably removed by filtration or evaporation, and the derivatised silica (SIL-A-B) is preferably dried hot and under vacuum.

The derivatised silica (SIL-A-B) thus obtained can be characterized through NMR spectroscopy, preferably through $^{13}$C NMR and $^{29}$Si NMR, as described in the experimental part Particularly preferred is a process for preparing derivatised silica SIL-A-B wherein the silanised silica (SIL-A) is preferably prepared by reaction between:

silica (C) is a precipitated amorphous silica, e.g. silica ZEOSIL1165 by Solvay the silanising agent (A) is a compound of formula (A)

$(R1)_3Si—X$      (A)

wherein R1 and R2 are independently selected from OR2 and at least one R1 is OR2,
R2 is selected from methyl and ethyl
X═X3 wherein X3 is —R3-Wb-C(R4)═CH$_2$,
R3 is an alkylene with 2 to 5 carbon atoms, more preferably with 3 carbon atoms, and R4 is selected from hydrogen and methyl; and/or
Compound (B) is a closed cage silsesquioxane of formula B1

$(RSiO_{1.5})_n$      (B1)

wherein n is an even number from 6 to 12, more preferably from 6 or 8, or mixtures thereof,
all groups R are reactive groups X3, wherein X3 is a group —R3-Wb-C(R4)═C(R4)R4,
R3 is a linear alkylene with 2 to 4 carbon atoms,
Wb is —O—CO—, and
R4, the same or different from each other, are selected from H and methyl.

The derivatised silica (SIL-A-B) obtainable according to one of the processes described above constitutes the second aspect of the present invention. Such a derivatised silica can be characterised through $^{13}$C NMR and $^{29}$Si NMR, as described in the present experimental part, The derivatised silica (SIL-A-B) according to the present invention is characterised by one or more of the following preferred aspects taken alone or in combination with one another.

Preferably, the derivatised silica (SIL-A-B) includes an amount of compound (A) expressed as a percentage by weight with respect to the starting silica (C) equal to at least 5%, preferably at least 10% by weight, and/or preferably the derivatised silica (SIL-A-B) includes an amount of compound (B), expressed as a percentage by weight with respect to the starting silica (C) equal to at least 3%, preferably at least 5%, more preferably at least 10% by weight.

The derivatised silica (SIL-A-B) may be incorporated into a master elastomeric composition in more concentrated form (masterbatch) and used for subsequent dilutions in elastomeric compositions for tyre components, or it may be directly introduced in the desired final amount in said compositions.

Therefore, a third aspect of the present invention relates to an elastomeric composition comprising at least 100 phr of a least one solid diene elastomeric polymer (E) and at least 3 phr of said derivatised silica according to the present invention (SIL-A-B).

Said elastomeric composition according to the present invention is characterised by one or more of the following preferred aspects taken alone or in combination with one another.

Preferably, said elastomeric composition comprises at least 5 phr, more preferably at least 10 phr of said derivatised silica (SIL-A-B).

Preferably, said elastomeric composition comprises no more than 70 phr, more preferably no more than 50 phr of said derivatised silica (SIL-A-B).

Preferably, said elastomeric composition comprises 5 to 70 phr, more preferably 10 to 50 phr of said derivatised silica (SIL-A-B).

Preferably, in the case of concentrated master compositions, the elastomeric composition comprises at least 100 phr of at least one solid diene elastomeric polymer (E), and
at least 50 or 60 or 70 or 80 or 90 phr of a derivatised silica (SIL-A-B) according to the second aspect of the invention.

The elastomeric composition for tyres according to the present invention comprises 100 phr of at least one solid diene elastomeric polymer (E).

By "solid elastomeric polymer or solid elastomer" it is meant a natural or synthetic polymer which at room temperature can be stretched repeatedly to at least twice its original length and which, after removal of the tensile load immediately returns with force to approximately its original length (definition according to ASTM, committee E8, Philadelphia 1976).

By "diene polymer" it is meant a polymer or copolymer derived from the polymerisation of one or more different monomers, among which at least one of them is a conjugated diene (conjugated diolefin).

Preferably, the solid diene elastomeric polymer (E) has a weight average molecular weight ($\overline{M}w$) higher than 80000 g/mol.

Preferably, the solid diene elastomeric polymer (E) which can be used in the present invention can be selected from those commonly used in sulphur-crosslinkable elastomeric materials, which are particularly suitable for producing tyres, that is to say, from elastomeric polymers or copolymers with an unsaturated chain characterised by a glass transition temperature (Tg) generally lower than 20° C., preferably in the range of from 0° C. to −110° C.

These polymers or copolymers may be of natural origin or may be obtained by solution polymerization, emulsion polymerization or gas-phase polymerization of one or more conjugated diolefins, optionally mixed with at least one comonomer selected from monovinylarenes and/or polar comonomers in an amount not exceeding 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof.

1,3-Butadiene and isoprene copolymers or 1,3-butadiene, isoprene and styrene terpolymers are particularly preferred.

Monovinylarenes, which may optionally be used as comonomers, generally contain from 8 to 20, preferably from 8 to 12 carbon atoms and may be selected, for example, from: styrene; 1-vinylnaphthalene: 2-vinyl naphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, or mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile or mixtures thereof.

Preferably, the solid diene elastomeric polymer (E) which can be used in the present invention can be selected, for example, from: cis-1,4-polyisoprene (natural or synthetic, preferably natural rubber NR), 3,4-polyisoprene, polybutadiene (BR), in particular polybutadiene with a high content of 1,4-cis, optionally halogenated isoprene/isobutene copolymers, 1,3-butadiene/acrylonitrile copolymers, styrene/1,3-butadiene copolymers (SBR), styrene/isoprene/1,3-butadiene copolymers, styrene/1,3-butadiene/acrylonitrile copolymers, or mixtures thereof.

The elastomeric composition according to the invention can optionally comprise at least one elastomeric polymer of one or more monoolefins with an olefinic comonomer or derivatives thereof (a'). The monoolefins can be selected from: ethylene and α-olefins generally containing from 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

The solid diene elastomeric polymer (E) may optionally be functionalised by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

The solid elastomeric polymer (E) may include one or more chain or terminated functionalized diene elastomers. For example, such a functionalized elastomer may contain one or more functional groups selected from hydroxyl groups, carboxyl groups, amino groups, siloxy groups, thiol groups and epoxy groups, such groups being available to participate in reactions with, for example, precipitated reinforcement silica.

Examples of functionalized elastomers are functionalized styrene/butadiene elastomers (functionalized SBR elastomers) containing amino and/or siloxy functional groups (such as alkoxylsilane like SiOR).

Representative of such functionalized amino SBR elastomers is, for example, SLR4601™ by Styron and T5560™ by JSR, and chain functionalized amino SBR elastomers mentioned, for example, in U.S. Pat. No. 6,936,669.

Representative of such functionalized siloxy SBR elastomers is, for example, SLR4610™ by Styron.

Representative of such functionalized amino and siloxy SBR elastomers is, for example, HPR350 ™ by JSR.

Other possible elastomers are styrene/butadiene functionalized elastomers (functionalized SBR elastomers) containing hydroxyl or epoxy functional groups.

Representative of such functionalized hydroxy SBR elastomers is, for example. Tufdene 3330™ by Asahi. Representative of such functionalized epoxy SBR elastomers is, for example, Tufdene E50™ by Asahi.

The elastomeric compositions according to the invention, find advantageous application in tyre components such as tread, underlayer, bead protective layers, bead fillers, sidewall insert or rubber compounds.

Examples of suitable commercial solid elastomeric polymers are natural rubber STR20, STR10 and TSS8 by Von Bundit, Synthetic polyisoprene SKI3 by Nizhnekamskneftekhim, Synthetic polyisoprene Nipol 2200 by Zeon, Synthetic polyisoprene IR2200 by JSR, Polybutadiene CB22, CB23, CB24, CB25, CB29, CB Nd60 by Lanxess, Polybutadiene NiBR CIS 132 and SE PB 5800 by Styron, BR51, BR730 by JSR, Polybutadiene Nd BR40, Nd BR60, KBR 01 by Kumho, Polybutadiene SKD-NHEODIMIO by Nizhnekamskneftekhim, Polybutadiene BR40, BR60 by Versalis, Polybutadiene Nipol BR1220 and Nipol BR1250H by Zeon, SBR Tufdene E581, F3440, F3420, 3830, 3835 and 4850 by Ashai-Kasei, SLR6430, SLR4400, SLR4402 by Styron, SR8325, SR8950 by Firestone, SOL 6450 SL, SOL 5220 by Kuhmo, BUNA 2438-2, BUNA 4525-0, BUNA 2538-2, BUNA 4518-3, BUNA 2525-0, PBR 4055 by Lanxess, SOL RX C 3534 T, SOL RX C 3737 T, SOL RC 2525 by Versalis, 33H23 and 18B10 by Synthos, SSBR 3626, SSBR 1810 by LG Chemicals, NS 462, N5540, N5612, N5522 by Zeon, Examples of suitable commercial solid elastomeric polymers with a high vinyl content are Tufdene E680, Asaprene E15, Tufdene 2831 by Ashai-Kasei, SLR 4630, SLR 4633, SLR 4601, SLR 4602 by Styron, DURADENE 738 and DURADENE 739 by Firestone, SL563 by JSR, SOL 5740, SOL 6360 SL by Kuhmo, BUNA 5025, BUNA 5228, PBR 4031, PBR 4053, BUNA 4526 by Lanxess, SOL RC 2564 T, SOL R 72612, SOL R 72606 by Versalis, 30H41, 25×52 by Synthos, SSBR 2550 by LG Chem, SE-6372, SE-6529, SE-6233, SE-6555 by Sumitomo, NS 620, NS 616, NS 460, NS 116 by Zeon. Preferably, in the case of applications as tread, the solid elastomeric diene polymer (E) of the present elastomeric compositions includes from 20 to 100 phr, preferably from 40 to 100 phr of SBR, and/or from 0 to 60 phr, preferably from 0 to 50 phr of BR, and/or from 0 to 70 phr, preferably from 0 to 60 phr, of NR.

The elastomeric composition according to the third aspect of the invention, including at least 100 phr of at least one solid diene elastomeric polymer (E) and at least 3 phr of a derivatised silica (SIL-A-B), can be prepared by mixing together the elastomeric components, the derivatised silica (SIL-A-B) and other additives that may be present according to any known incorporation method, such as batch, semi-continuous or continuous processes. Suitable mixing processes can be for example melt blending, and mixing in solution.

The mixing can be performed, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

As demonstrated by the examples given in the experimental part, elastomeric compositions incorporating the derivatised silica (SIL-A-B) according to the invention, prepared as described above, show an unexpected and large increase of the modulus and a simultaneous reduction of hysteresis.

The Applicant has realised that this advantageous trend of the two properties, properties which generally in the case of conventional reinforcement fillers such as silica, increase or decrease in tandem, can also be achieved with an alternative preparation, i.e. by derivatising the silica (C) with the silanising agent (A) and compound (B) in-situ during the mixing to incorporate the silica itself in the elastomeric material.

The resulting elastomeric composition, prepared in-situ (referred to hereinafter as "in-situ elastomeric composition" for brevity), once vulcanised, advantageously has significantly higher modulus values, with the same hysteresis, with respect to similar compositions including silica.

The in-situ elastomeric composition is the fourth aspect of the present invention. Said elastomeric composition according to the present invention is characterised by one or more of the following preferred aspects taken alone or in combination with one another.

Preferably, said in-situ elastomeric composition comprises at least
100 phr of at least one solid diene elastomeric polymer (E),
at least 10 or 20 or 25 phr of silica (C),
at least 0.5 or 1.5 or 2 phr of a silanising agent of formula $(R1)_3Si-X$ (A), and
at least 1 or 2 or 4 or 6 phr of a compound of formula (B) as defined above.

Preferably, the in-situ elastomeric composition comprises at least
100 phr of at least one solid diene elastomeric polymer (E),
5 to 130 phr of silica (C),
0.3 to 15 phr of silanising agent of formula $(R1)_3Si-X$ (A), and
0.5 to 30 phr of a compound of formula (B) as defined above.

Preferably, the in-situ elastomeric composition comprises at least
100 phr of at least one solid diene elastomeric polymer (E),
5 to 60 phr of silica (C),
0.5 to 10 phr of silanising agent of formula $(R1)_3Si-X$ (A), and
1 to 30 phr of a compound of formula (B) as defined above.

Preferably, said "in-situ" elastomeric composition comprises at least
100 phr of at least one solid diene elastomeric polymer (E),
no more than 60 or 80 or 100 or 120 or 40 or 50 phr silica (C),
no more than 20 or 10 or 7 phr of a silanising agent of formula $(R1)_3Si-X$ (A), and
no more than 30 or 20 or 15 phr of a compound of formula (B) as defined above.

Preferably, in the case of a concentrated master elastomeric composition (masterbatch) prepared "in-situ", said composition comprises at least
100 phr of at least one solid diene elastomeric polymer (E),
at least 50 phr of silica (C),
at least 3 phr of a silanising agent of formula $(R1)_3Si-X$ (A), and
at least 5 phr of a compound of formula (B) as defined above.

Preferably, in the case of a concentrated master elastomeric composition (masterbatch) prepared "in-situ", said composition comprises at least
100 phr of at least one solid diene elastomeric polymer (E),
no more than 150 or 130 or 120 or 100 phr of silica (C),
no more than 50 or 40 or 30 or 20 phr of a silanising agent of formula $(R1)_3Si-X$ (A), and
no more than 50 or 40 or 30 or 20 phr of a compound of formula (B) as defined above.

The preferences expressed above for the preparation of derivatised silica according to the first aspect of the invention, such as the type of silica (C), the preferred silanising agents (A) or the preferred compounds (B) or, for the diene elastomeric polymer (E) usable in the compositions according to the third aspect similarly apply to the present elastomeric compositions with in-situ silica derivatisation and to their preparation.

The in-situ elastomeric composition is preferably prepared according to a process which provides for:
feeding to a suitable mixing apparatus at least
100 phr of at least one solid diene elastomeric polymer (E),
at least 5 phr of silica (C),
at least 0.3 phr of a silanising agent of formula $(R1)_3Si-X$ (A), and
at least 0.5 phr of a compound of formula (B) as defined above, and
mixing and dispersing said components, to yield said elastomeric composition.

The composition preferences described above similarly apply to the present process for preparing the composition itself.

The preparation of the present elastomeric composition may be carried out by feeding in a mixer the elastomeric components (E) with silica (C), the silanising agent (A), compound (B) and the other additives that may be present and mixing them according to any technique suitable for mixing elastomeric materials, with batch, semi-continuous or continuous processes.

Suitable mixing apparatus may be, for example, an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

According to the fifth aspect of the present invention, the elastomeric composition according to the third or fourth aspect of the invention may further comprise at least one vulcanising agent (F) and possibly one or more vulcanisation adjuvants.

Said composition is called herein vulcanisable or green elastomeric composition since comprising at least the essential components for vulcanisation, i.e. at least the elastomer and the vulcanising agent, it may be directly subjected to vulcanisation.

The vulcanisable elastomeric composition according to the present invention is characterised by one or more of the following preferred aspects taken alone or in combination with one another.

Preferably, the elastomeric composition according to the third or fourth aspect of the invention further comprises
at least 0.25 phr of at least one vulcanising agent (F) as defined below.

Preferably, the vulcanisable elastomeric composition according to the invention comprises at least 0.3 or 0.5 or 0.7 or 1 phr of at least one vulcanising agent (F).

The vulcanising agent (F) may be selected from radical initiators (D), as defined above, or in the class of sulphur-based vulcanising agents such as sulphur, or alternatively sulphur-containing molecules (sulphur donors).

Suitable sulphur-based vulcanising agents may advantageously be selected, for example, from: (i) soluble sulphur (crystalline sulphur); (ii) insoluble sulphur (polymeric sulphur); (iii) sulphur dispersed in oil (such as 33% sulphur, known by the trade name Crystex OT33 from Eastman); (iv) sulphur donors such as, for example, caprolactam disulphide (CLD), bis[(trialkoxysilyl)propyl]polysulphides, dithiophosphates; and mixtures thereof.

Preferably, the vulcanising agent (F) is present in the vulcanisable elastomeric compositions of the invention in an amount from 0.25 to 15 phr, preferably from 0.5 to 10 phr, even more preferably from 1 to 5 phr.

Preferably, the vulcanisable elastomeric compositions further comprise one or more vulcanisation adjuvants, in particular
0.5 to 10 phr of at least one activating agent for the vulcanisation (F1); and/or
0.1 to 10 phr of at least one accelerant for the vulcanisation (F2), and/or
0.05 to 2 phr of at least one retardant for the vulcanisation (F3).

Vulcanisation activators (F1) that are particularly effective are zinc compounds. In particular, ZnO, ZnCO3, zinc salts of saturated or unsaturated fatty acids containing from 8 to 18 carbon atoms, are used.

For example, zinc stearate is used, preferably formed in situ in the elastomeric composition, by ZnO and stearic acid, or magnesium stearate, formed by MgO, or mixtures thereof.

Said vulcanisation activators are preferably used in the elastomeric composition in an amount of from 1 phr to 5 phr, more preferably from 2 phr to 4 phr.

An example of activator is the product Aktiplast ST marketed by Rheinchemie.

Preferably, the vulcanisable elastomeric composition may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

An example of vulcanisation accelerant is the N-cyclohexyl-2-benzothiazyl-sulfenamide Vulkacit® CZ/C marketed by Lanxess.

Said vulcanisation accelerants are preferably used in the elastomeric composition in an amount of from 0.2 to 5 phr, more preferably from 0.5 to 4 phr.

The present elastomeric compositions may optionally comprise one or more vulcanisation retardants (F3) such as, for example, N-cyclohexylthio phthalimide (VULKALENT G, —Lanxess).

Preferably, if present, said retardants are used in an amount of between 0.1 and 1 phr.

Generally, the vulcanisation adjuvants are added during a non-productive mixing and dispersion step. The elastomeric compositions described above according to the invention may comprise other commonly used additives, selected on the basis of the specific application for which the composition is intended. For example, the following may be added to said materials: antioxidants, anti-ageing agents, plasticisers, adhesives, anti-ozone agents, modifying resins, waxes, conventional reinforcement fillers such as carbon black, precipitated amorphous silica, amorphous silica of natural origin, such as diatomaceous earth, calcium carbonate, titanium dioxide, talc, alumina, aluminosilicates, kaolin, silicate fibres and mixtures thereof.

Typically, in the production of the present vulcanisable elastomeric compositions, here may be one or more non-productive mixing and dispersion steps in which all components except those capable of promoting the vulcanisation (such as the vulcanising agents and the accelerants) are fed to the mixing device, and a subsequent productive step in which the elastomeric composition obtained from the first steps, as well as the components capable of promoting the vulcanisation, are fed to the same or a different mixing device to yield the vulcanisable elastomeric composition.

To this end, after one or more thermomechanical processing steps, the vulcanising agent is incorporated in the materials, preferably together with vulcanisation accelerators. In the final treatment step, the temperature is generally kept below 120° C. and preferably below 100° C., so as to prevent any undesired pre-crosslinking phenomena.

The vulcanisable elastomeric compositions according to the invention may advantageously be used to produce a green or at least partially vulcanised tyre component according to the sixth aspect of the invention, such as, by way of non-limiting example, tread, under-layer, sheet, bead protective layers, side insert (lunette), bead, rubber compounds or sidewall.

Said tyre component according to the present invention is characterised by one or more of the following preferred aspects taken alone or in combination with one another.

For example, the green vulcanisable elastomeric composition may be an elastomeric composition for tread, for example processed in the form of a non-vulcanised extruded elastomeric strip, which can be used in the manufacture of the green tyre, in which the non-vulcanised shaped tread is applied to the carcass and the green tyre is then formed and vulcanised.

Alternatively, for an operation to replace a worn tread (retread), an elastomeric strip of non-vulcanised or partially vulcanised tread can be applied to a vulcanised tyre carcass from which the previous tread was abraded, and the new tread vulcanised thereon.

The tyre component according to the invention is selected from among the tread, carcass structure, belt structure, under-layer, bead protective layers, sidewall, sidewall insert, mini-sidewall, under-liner, rubber layers, bead filler and sheet, more preferably tread, under-layer and sidewall insert.

The compositions according to the invention, including both the previously derivatised silica and the one prepared in-situ, can be used in all conventional applications of elastomeric compositions normally filled with silica, such as in the tread or in the under-layer, in replacement of or in addition to silica. Being very effective in increasing the modulus values to equal or even low hysteresis, they can in fact be used in smaller amounts than silica itself.

Moreover, the reinforcement materials according to the invention, i.e. both the previously derivatised silica and the one prepared in-situ, are capable of imparting to elastomeric compositions, filled with silica normally unsuitable for demanding applications, modulus values so high as to allow uses that were unthinkable to date, for example as components of the bead or the bead protective layers, without necessarily resorting to the use of hardening resins.

The present elastomeric compositions advantageously allow obtaining much higher mechanical performance without having to excessively increase the extent of cross-linking, being actually capable of reducing the amount of vulcanising and vulcanisation adjuvants, such as sulphur and zinc oxide.

The vulcanisation of the vulcanisable elastomeric composition is carried out according to known techniques, usually in the presence of vulcanisation agents and adjuvants, which induce the cross-linking of the elastomeric matrix and the incorporation of the present reinforcement material, thus providing the vulcanised elastomeric composition.

The seventh aspect of the present invention is a tyre for vehicle wheels comprising at least one component according to the sixth aspect of the invention. Said component may be selected from tread, carcass structure, belt structure, under-layer, bead protection layers, sidewall, sidewall insert, mini-sidewall, under-liner, rubber layers, bead filler and sheet.

Said tyre according to the present invention is characterised by one or more of the following preferred aspects taken alone or in combination with one another.

Preferably, the tyre according to the present invention is a tyre for high-performance vehicles (HP, SUV and UHP), comprising at least
one carcass structure comprising at least one carcass layer having opposite lateral edges associated with respective bead structures;
one belt structure applied in radially outer position with respect to the carcass structure,
one tread band applied in radially outer position with respect to said belt structure, and possibly at least
one under-layer and/or one bead protective layer and/or one sidewall and/or one sidewall insert and/or
one mini-sidewall and/or one under-liner and/or one rubber layer and/or one sheet,
wherein at least one from among said carcass structure and/or tread band and/or belt structure and/or under-layer and/or bead protective layer and/or sidewall and/or sidewall insert and/or mini-sidewall and/or under-liner and/or rubber layer and/or bead structures and/or sheet comprises a vulcanised elastomeric composition obtained by vulcanising a vulcanisable elastomeric composition according to the invention.

Preferably, the tyre according to the invention comprises the above vulcanised elastomeric composition at least in the tread.

Preferably, the tyre according to the invention comprises the above vulcanised elastomeric composition at least in the under-layer.

Preferably, the tyre according to the invention comprises the above vulcanised elastomeric composition at least in the sidewall insert.

Preferably, the tyre according to the invention comprises the above vulcanised elastomeric composition at least in the bead filler.

Preferably, the tyre according to the invention comprises the above vulcanised elastomeric composition in the tread and in one or more components selected from under-layer, bead protective layer, sidewall, sidewall insert, mini-sidewall, under-liner, rubber layers, bead filler and sheet.

Preferably, the tyre according to the invention comprises the above vulcanised elastomeric composition in the tread and in the under-layer.

Preferably, the tyre according to the invention comprises the above vulcanised elastomeric composition in the tread and in the sidewall.

An embodiment according to the present invention is a tyre for vehicles, preferably for vehicles the driving performance of which takes advantage of an increase in the stiffness and a reduction in hysteresis and Payne effect of the elastomeric composition, such as high-performance HP, UHP and SUV vehicles.

The tyre according to the invention can be employed on two- or four-wheeled vehicles, on heavy vehicles, or on light transport vehicles.

The tyre according to the invention can be for summer or winter use or for all seasons.

The tyre according to the present invention can be built, shaped, moulded and vulcanised with various methods that will be readily apparent to the man skilled in the art.

The tyre of the present invention can be manufactured according to a process which comprises:
building components of a green tyre on at least one forming drum;
shaping, moulding and vulcanising the tyre;
wherein building components of a green tyre comprises:
manufacturing at least one green component comprising the vulcanisable elastomeric composition as described above.

In the present description, the term green is generally used to indicate a material, a composition, a component or a tyre not yet vulcanised.

BRIEF DESCRIPTION OF THE FIGURES

FIG. 6 is the spectrum $^{13}$C-NMR of a sample of derivatised silica (SIL-A-B) according to the present invention compared to the spectrum of a sample of silanised silica (SIL-A).

DESCRIPTION OF EXAMPLES OF THE INVENTION

The description of some examples of the invention is given hereinafter by way of non-limiting indication.

Figure 1:
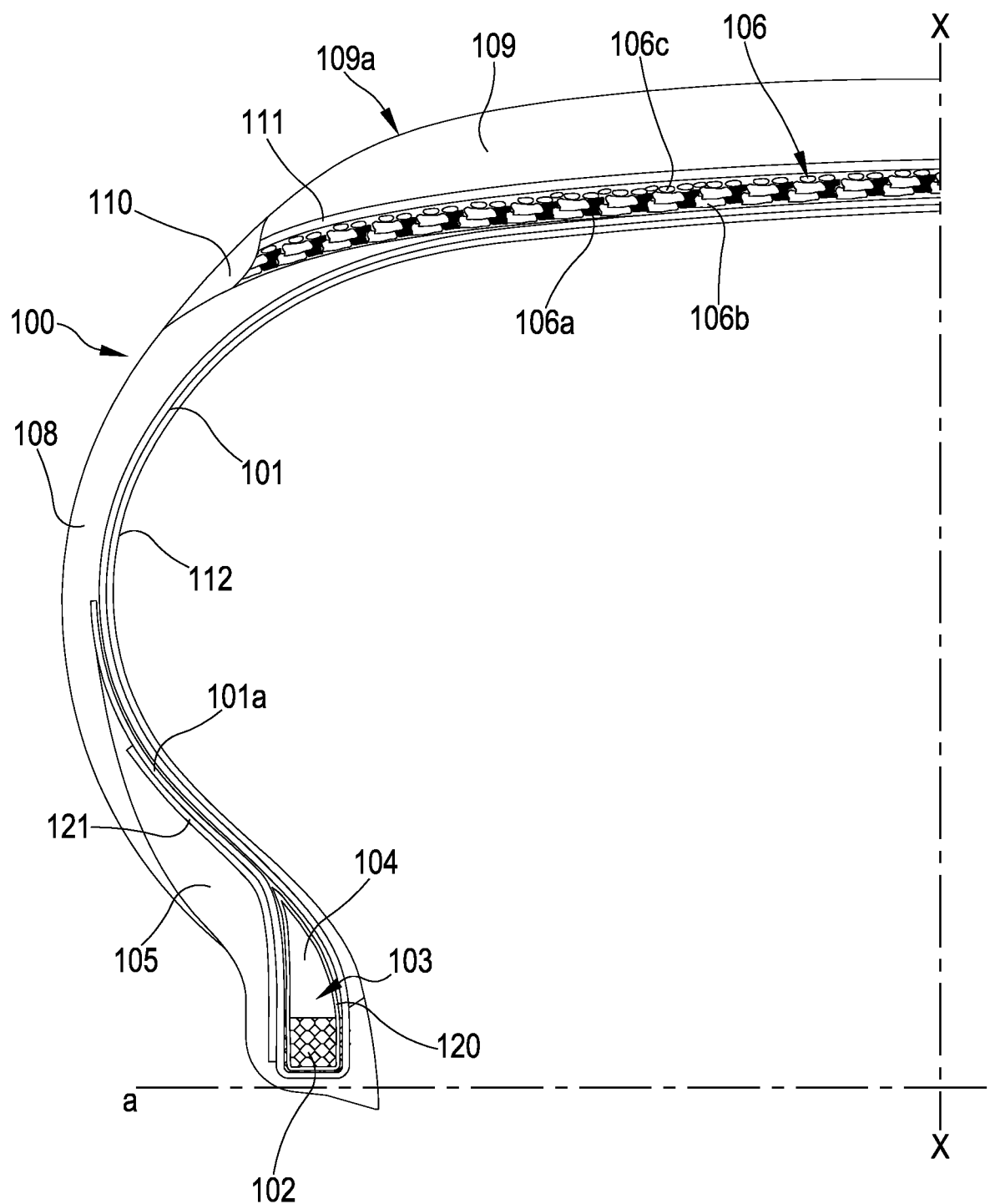
FIG. 1 shows a radial half-section of a tyre for vehicle wheels.

FIG. 1 shows a radial half-section of a tyre for vehicle wheels according to the invention.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Tyre 100 for four-wheeled vehicles comprises at least one carcass structure, comprising at least one carcass layer 101 having respectively opposite end flaps engaged with respective annular anchoring structures 102, referred to as bead cores, possibly associated to a bead filler 104.

The tyre area comprising the bead core 102 and the filler 104 forms a bead structure 103 intended for anchoring the tyre onto a corresponding mounting rim, not shown.

The carcass structure is usually of radial type, i.e. the reinforcement elements of the at least one carcass layer 101 lie on planes comprising the rotational axis of the tyre and substantially perpendicular to the equatorial plane of the tyre. Said reinforcement elements generally consist of textile cords, such as rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called carcass flaps 101a as shown in FIG. 1.

In one embodiment, the coupling between the carcass structure and the bead structure can be provided by a second carcass layer (not shown in FIG. 1) applied in an axially outer position with respect to the first carcass layer.

An anti-abrasive strip 105 is arranged in an outer position of each bead structure 103.

The carcass structure is associated to a belt structure 106 comprising one or more belt layers 106a, 106b placed in radial superposition with respect to one another and with respect to the carcass layer, having typically textile and/or metallic reinforcement cords incorporated within a layer of vulcanised elastomeric composition.

Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of elongated reinforcement elements, typically metallic or textile cords, oriented in a substantially circumferential direction, thus forming an angle of a few degrees (such as an angle of between about 0° and 6°) with respect to a direction parallel to the equatorial plane of the tyre, and coated with vulcanised elastomeric composition.

A tread band 109 of vulcanised elastomeric composition is applied in a position radially outer to the belt structure 106.

Moreover, respective sidewalls 108 of vulcanised elastomeric composition are applied in an axially outer position on the lateral surfaces of the carcass structure, each extending from one of the lateral edges of tread 109 at the respective bead structure 103.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1, An under-layer 111 of vulcanised elastomeric composition can be arranged between the belt structure 106 and the tread band 109.

A strip consisting of elastomeric composition 110, commonly known as "mini-sidewall", of vulcanised elastomeric composition can optionally be provided in the connecting zone between sidewalls 108 and the tread band 109, this mini-sidewall generally being obtained by co-extrusion with the tread band 109 and allowing an improvement of the mechanical interaction between the tread band 109 and sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

The rigidity of the tyre sidewall 108 can be improved by providing the bead structure 103 with a reinforcement layer 120 generally known as "flipper" or additional strip-like insert.

Flipper 120 is a reinforcement layer which is wound around the respective bead core 102 and the bead filler 104 so as to at least partially surround them, said reinforcement layer being arranged between the at least one carcass layer 101 and the bead structure 103. Usually, the flipper is in contact with said at least one carcass layer 101 and said bead structure 103.

Flipper 120 typically comprises a plurality of textile cords incorporated within a layer of vulcanised elastomeric composition.

The bead structure 103 of the tyre may comprise a further protective layer which is generally known by the term of "chafer" 121 or protective strip and which has the function of increasing the rigidity and integrity of the bead structure 103.

Chafer 121 usually comprises a plurality of cords incorporated within a layer of vulcanised elastomeric composition. Such cords are generally made of textile materials (such as aramide or rayon) or metal materials (such as steel cords).

A layer or sheet of elastomeric composition can be arranged between the belt structure and the carcass structure. The layer can have a uniform thickness. Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer or sheet of elastomeric composition as described above can be placed between said belt structure and said tread band, said additional layer or sheet extending preferably on a surface substantially corresponding to the extension surface of said belt structure.

The vulcanisable elastomeric composition according to the present invention can be advantageously incorporated in one or more of the components of the tyre selected from the belt structure, carcass structure, tread band, under-layer, sidewall, mini-sidewall, sidewall insert, bead, flipper, chafer, sheet and bead protective layers.

The elastomeric composition of one or more of the components mentioned above according to the present invention may comprise at least:
100 phr of at least one solid diene elastomeric polymer (E), at least 3 phr of a derivatised silica (SIL-A-B) according to the second aspect of the invention.

The elastomeric composition of one or more of the components mentioned above according to the present invention may comprise at least
100 phr of at least one solid diene elastomeric polymer (E),
at least 5 phr of silica (C),
at least 0.3 phr of a silanising agent of formula (R1)$_3$Si—X (A), and
at least 0.5 phr of a compound of formula (B) as defined above.

The above elastomeric compositions of one or more tyre components mentioned above according to the present invention further comprise at least:
- at least 0.1 phr of at least one vulcanising agent (F), and preferably
- 0.5 to 10 phr of at least one activating agent for the vulcanisation (F1); and/or
- 0.1 to 10 phr of at least one accelerant for the vulcanisation (F2), and/or
- 0.05 to 2 phr of at least one retardant for the vulcanisation (F3).

According to an embodiment not shown, the tyre may be a tyre for motorcycle wheels which is typically a tyre that has a straight section featuring a high tread camber.

According to an embodiment not shown, the tyre may be a tyre for heavy transport vehicle wheels, such as trucks, buses, trailers, vans, and in general for vehicles in which the tyre is subjected to a high load.

Preferably, such a tyre is adapted to be mounted on wheel rims having a diameter equal to or greater than 17.5 inches for directional or trailer wheels.

EXAMPLES

Where not indicated otherwise, in the present experimental part the components of the compositions are expressed in phr (parts per hundreds of rubber).

The following Tables 1 and 2 summarise comparative experiments and according to the invention for preparing the reinforcement materials (Ex. 1-3), of the elastomeric materials comprising them (Examples 4b, 6b, 6c, 6d and 7c) (previously derivatised silica) and of the elastomeric materials prepared by mixing "in-situ" all ingredients (Examples 4a, 5a, 5b, 6a, 7a, 7b, 8a, 8b, 9a, 9b and 9c):

TABLE 1 reinforcement materials

| Ex. | Comp./Inv. | Reagents | Reinforcement material | p/w MAPOSS with respect to silica |
|---|---|---|---|---|
| 1 | Comp. | silica and TMMS (A) | SIL-TMMS (SIL-A) | |
| 2 | Comp. | silica and TEMS (A) | SIL-TEMS (SIL-A) | |
| 3a | Inv. | SIL-TMMS (SIL-A) and MAPOSS (B) | SIL-TMMS-MAPOSS10 (SIL-A-B) | 10 p/w |
| 3b | Inv. | SIL-TMMS (SIL-A) and MAPOSS (B) | SIL-TMMS-MAPOSS5 (SIL-A-B) | 5 p/w |
| 3c | Inv. | SIL-TMMS (SIL-A) and MAPOSS (B) | SIL-TMMS-MAPOSS3 (SIL-A-B) | 3 p/w |
| 3d | Inv. | SIL-TEMS (SIL-A) and MAPOSS (B) | SIL-TEMS-MAPOSS10 (SIL-A-B) | 10 p/w | wherein SIL: silica; TEMS: 3-(triethoxysilyl)propyl methacrylate; TMMS: 3-(trimethoxysilyl)propyl methacrylate; MAPOSS: Octamethacrylpropyl silsesquioxane p/w: parts by weight.

TABLE 2 elastomeric materials including the reinforcement materials

| Ex. | Comp./Inv. | Type of reinforcement material | Specific reinforcement material | Preparation of the reinforcement material | Elastomer (E) | Vulcanising agent (F) |
|---|---|---|---|---|---|---|
| 4a | Comp | SIL + A | SIL + TMMS | In-situ | SBR 2525 | DCP |
| 4b | Inv. | SIL – A – B | SIL – TMMS – MAPOSS10 | Preformed Ex. 3a | SBR 2525 | DCP |
| 5a | Comp | SIL + A | SIL + TMMS | In-situ | SBR 2525 | DCP |
| 5b | Comp | SIL + B | SIL + MAPOSS | In-situ | SBR 2525 | DCP |
| 5c | Inv. | SIL + A + B | SIL + TMMS + MAPOSS | In-situ | SBR 2525 | DCP |
| 6a | Comp | SIL + A | SIL + TMMS | In-situ | SLR 4630 | DCP |
| 6b | Inv. | SIL – A – B | SIL – TMMS – MAPOSS3 | Preformed Ex. 3c | SLR 4630 | DCP |
| 6c | Inv. | SIL – A – B | SIL – TMMS – MAPOSS5 | Preformed Ex. 3b | SLR 4630 | DCP |
| 6d | Inv. | SIL – A – B | SIL – TMMS – MAPOSS10 | Preformed Ex. 3a | SLR 4630 | DCP |
| 7a | Comp | SIL + A | SIL + TMMS | In-situ | SLR 4630 | sulphur/CBS |
| 7b | Inv. | SIL + A + B | SIL + TMMS + MAPOSS | In-situ | SLR 4630 | sulphur/CBS |
| 7c | Inv. | SIL – A – B | SIL – TMMS – MAPOSS10 | Preformed Ex. 3a | SLR 4630 | sulphur/CBS |
| 8a | Comp | SIL + A + B | SIL + TESPT + MAPOSS | In-situ | SLR 4630 | DCP |
| 8b | Inv. | SIL + A + B | SIL + TEMS + MAPOSS | In-situ | SLR 4630 | DCP |

TABLE 2-continued elastomeric materials including the reinforcement materials

| Ex. | Comp./Inv. | Type of reinforcement material | Specific reinforcement material | Preparation of the reinforcement material | Elastomer (E) | Vulcanising agent (F) |
|---|---|---|---|---|---|---|
| 9a | Comp | SIL + A | SIL + TEMS | In-situ | IR/BR | Luperox 101 |
| 9b | Comp | SIL + A | SIL + TEMS | In-situ | IR/BR | Luperox 101 |
| 9c | Inv. | SIL + A + B | SIL + TEMS + MAPOSS | In-situ | IR/BR | Luperox 101 |

Key: Comp.: comparative example, Inv.: example according to the invention, SIL silica, A: silanising agent, B: silsesquioxane, TEMS: 3-(triethoxysilyl)propyl methacrylate; 3-(trimethoxysilyl)propyl methacrylate, SIL-TMMS-MAPOSS3, SIL-TMMS-MAPOSS5, SIL-TMMS-MAPOSS10, SIL-TEMS-MAPOSS10 are the inventive products of silanised silica derivatised with POSS, SLR 4630 is SBR with high vinyl by Styron, SBR 2525 is SBR with low vinyl by Lanxess, IR is synthetic polyisoprene, BR is high cis neodymium polybutadiene, DCP dicumylperoxide, Luperox 101 is 2,5-bis(t-butyl peroxy)-2,5-dimethyl hexane, CBS is cyclohexylbenzothiazolsulphenamide, primary accelerant.

In the present description, unless stated otherwise, the sign "+" between components means that the same are added separately to the elastomer and made to react in-situ during mixing. For example, the addition of silica and MAPOSS to the elastomeric material may be referred to as SIL+MAPOSS.

Instead, the symbol "-" between two components is generally meant to indicate that such components have pre-reacted with each other, such as SIL-TEMS is the product obtained by reaction of silica and silanising agent TEMS as described in example 2.

Example 1

Preparation of Silanised Silica (SIL-A) by Reaction of Silica (C) with the Silanising Agent TMMS (A) in the Absence of Acid Catalyst About 15 g of trimethoxypropylmethacrylsilane (TMMS distributed by Sigma Aldrich) were dispersed in 200 ml of a water/methanol solution (96/4 p/w) and kept under stirring at room temperature for 15 minutes. 50 g of silica (Zeosil 1165 by Rhodia) were added and left under vigorous stirring for 48 h at room temperature. The solvent is evaporated at the rotavapor and the sample is dried in an oven at 120° C. overnight. About 60 g of silanised silica (SIL-TMMS) were obtained.

Example 2

Preparation of Silanised Silica (SIL-A) by Reaction of Silica (C) with the Silanising Agent TEMS (A) in the Presence of Acid Catalyst About 25 g of triethoxypropylmethacrylsilane (TEMS distributed by GELEST) were dispersed in 200 ml of toluene and kept under stirring at room temperature for 15 minutes. 50 g of silica and 5.0 ml of trifluoroacetic acid were added and left under vigorous stirring for 48 h at room temperature. The solvent was evaporated at the rotavapor and the sample is dried in an oven at 120° C. overnight. About 65 g of silanised silica (SIL-TEMS) were obtained.

Example 3

Derivatisation of Silanised Silica (SIL-A) with MAPOSS (B)

Example 3a 1.5 g of octamethacrylpropyl silsesquioxane (Hybrid Plastic MA0735, MAPOSS for brevity) were suspended in 150 ml of toluene at room temperature and left under stirring 15 minutes. To the suspension thus obtained were added 15 g of Silica-TMMS prepared as described in Example 1. To the suspension heated under reflux and under stirring were added 0.03 g of dicumylperoxide (DCP) and the suspension was kept under stirring at the same temperature for 3 h. The solvent was removed at the rotavapor and the sample is dried in an oven at 120° C. overnight. About 16 g of derivatised silica were obtained (SIL-TMMS-MAPOSS10 where 10 indicates the parts by weight of MAPOSS with respect to the weight of silica).

The same procedure of Example 3a was repeated but using 0.75 g and 0.45 g of MAPOSS, obtaining about 15 g of SIL-TMMS-MAPOSS5 (Example 3b) and about 14 g of SIL-TMMS-MAPOSS3 (Example 3c), respectively.

Finally, the same procedure of example 3a was repeated but using the silanised silica SIL-TEMS obtained as described in example 2, obtaining about 16 g of SIL-TEMS-MAPOSS10 (Example 3d), substantially identical to the material of example 3a, since the ethoxy groups of silane reacted with silica and were removed as volatile ethanol.

Figure 5:
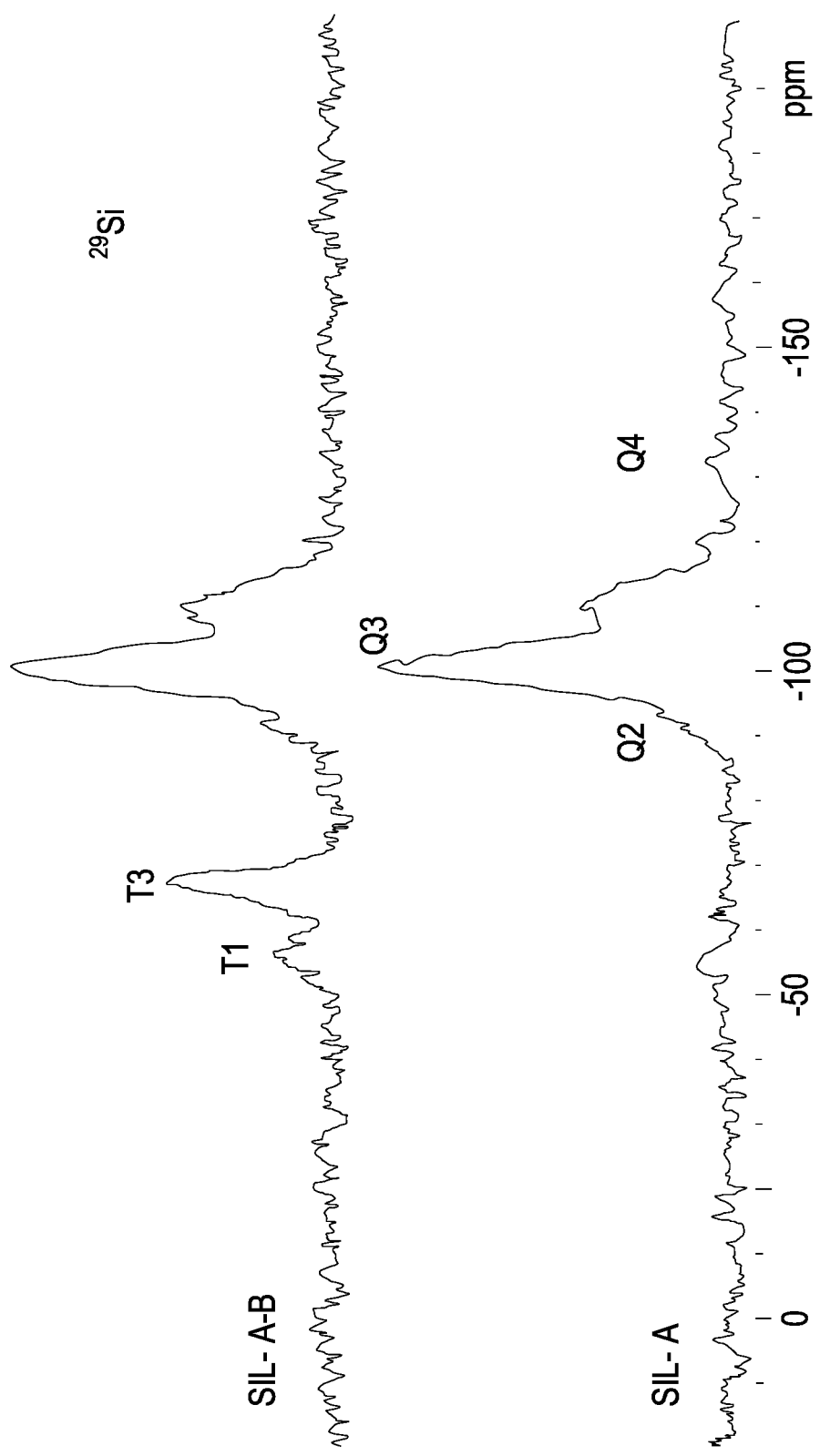
FIG. 5 is the spectrum $^{29}$Si-NMR of a sample of derivatised silica (SIL-A-B) according to the present invention compared to the spectrum of a sample of silanised silica (SIL-A).

A sample of silanised silica (SIL-TMMS Ex. 1) and a sample of derivatised silica according to the invention (SIL-TMMS-MAPOSS10 Ex. 3d) were analysed by NMR spectroscopy ($^{29}$Si and $^{13}$C), As can be seen in FIG. 5, the NMR spectrum of $^{29}$Si confirms the incorporation of silsesquioxane in the derivatised silica SIL-A-B. In fact, in addition to signals $Q^2Q^3$ and $Q^4$ present in both spectra, attributable to silica, in the spectrum of derivatised silica SIL-A-B peaks T1 and T3 are clearly visible, associated to the cage structure of agent (B).

As can be seen in FIG. 6, the NMR spectrum of $^{13}$C for sample SIL-A-B shows between 130 and 140 ppm the presence of signals of the double bonds of the methacrylic group.

This confirms that also after the synthesis reaction of SIL-A-B there are still reactive groups deriving from the silanising agent and from silsesquioxane. The Applicant believes that these reactive groups, in the presence of a radical initiator, would be capable of effectively interacting with the elastomer, leading to optimal cross-linking.

Preparation of Elastomeric Materials Including the Reinforcement Materials and their Properties Samples of vulcanised elastomeric materials were prepared to evaluate the effect of the incorporation of the new reinforcement materials of the invention with respect to traditional fillers or ones described in the literature, in particular on the properties of moduli and hysteresis.

The elastomeric materials were prepared according to this general procedure:

The elastomers were loaded into an internal mixer (Brabender or Banbury)

The silica and the possible reagents for the "in-situ" derivatisation thereof or the silica already derivatised were added to the mixer and mixed for about 5 minutes.

Stearic acid, 6PPD and ZnO were added, continuing the mixing. As soon as the temperature reached 145° C.±5° C., the elastomeric material was unloaded.

The material from the previous step was introduced in an internal mixer (Brabender or Banbury), DCP, Luperox 101 or the CBS/sulphur system were added and the mixing was carried out for 3 minutes at 90° C.

Evaluation of the Elastomeric Materials

Properties of Non-Vulcanised Materials

The vulcanisable (green) elastomeric materials of Examples 9a, 9b and 9c were subjected to the following evaluations:

MDR rheometric analysis (according to ISO 6502): a rheometer Alpha Technologies type MDR2000 was used. The tests were carried out at 170° C. for 20 minutes at an oscillation frequency of 1.66 Hz (100 oscillations per minute) and an oscillation amplitude of ±0.5°, measuring the time necessary to achieve an increase of two rheometric units (TS2) and the time necessary to achieve 60% (T60) and 90% (T90), respectively, of the final torque value (Mf). The maximum torque value MH and the minimum torque value ML were also measured.

The results of these analyses on the samples of examples 9a-9c are shown in Table 8.

Properties of Vulcanised Materials

The elastomeric materials of Examples 9a, 9b, 9c were subjected to the following evaluations after vulcanisation:

The static mechanical properties were measured at 23° C. according to the ISO 37:2005 standard.

In particular, the load at different levels of elongation (100% and 300%, named CA1 and CA3), the load at break CR were measured on samples of the elastomeric materials mentioned above, vulcanised at 170° C. for 15 minutes.

The tensile tests were carried out on straight axis Dumbell specimens.

The vulcanised elastomeric materials of Examples 4 to 9 were subjected to the following evaluations:

The dynamic mechanical properties were measured using an Instron dynamic device in traction-mode according to the following methods.

A sample of the elastomeric materials of the Examples vulcanised at 170° C. for 15 minutes having a cylindrical shape (length=25 mm; diameter=14 mm), subjected to preload compression up to 25% of the longitudinal deformation with respect to the initial length and maintained at the predetermined temperature (equal to −10° C., 0° C., 23° C. or 70° C.) for the whole duration of the test, was subjected to a dynamic sinusoidal strain having an amplitude of ±3.5% with respect to the length under pre-load, with a frequency of 100 Hz.

The dynamic mechanical shear properties were evaluated for the samples of Examples 4 to 9 using a Monsanto R.P.A. 2000 according to the following method: cylindrical test specimens with weights from 4.5 to 5.5 g were obtained by punching the vulcanisable elastomeric composition being tested.

These samples were vulcanised in the "RPA" instrument at 170° C. for 10 minutes or 15 minutes depending on the vulcanisation kinetics and were subjected to dynamic measurement of the dynamic elastic shear modulus (G') at 70° C., frequency of 10 Hz, deformation between 0.1% and 10%, and Tan delta (hysteresis or dissipation factor, Tan d), calculated as the ratio between viscous modulus (G") and elastic modulus (G') measured in the same conditions (70° C., 10 Hz).

The Payne effect was assessed in absolute terms through the difference between moduli (G') and at 10% and 0.5%, and in relative terms as a percentage variation between 10% and 0.5% with respect to modulus G' at 9%.

The following Tables list the recipes for preparing the elastomeric materials according to the invention and comparative and the results of the analyses described above conducted on those samples.

Example 4

The following Table 3 shows the components of the elastomeric materials of the comparative Example 4a, of Example 4b according to the invention and of a conventional reference bead elastomeric material—where silica is traditionally not used as it is unsuitable to impart such high moduli necessary for this particular application—and their values of G', dG' and tan Delta were measured, according to the above methods, on samples vulcanised at 170° C. for 10 minutes:

TABLE 3

| | Ex. 4a Comparative SIL + TMMS | Ex. 4b Invention SIL-TMMS-MAPOSS | Conventional bead material |
|---|---|---|---|
| Component (amount in phr) | | | |
| SBR 2525 | 100 | 100 | |
| IR | | | 100 |
| Silica 1165 | 30 | | |
| TMMS | 3 | | |
| SIL-TMMS-MAPOSS10 | | 33 | |
| N375 | | | 70 |
| Stearic acid | 2 | 2 | 2 |
| 6PPD | 2 | 2 | 2 |
| ZnO | 3.5 | 3.5 | 8 |
| Reactive phenolic resin | | | 15 |
| DCP | 2 | 2 | |
| HMMM 65% | | | 6 |
| TBBS | | | 1 |
| sulphur | | | 7 |
| Properties | | | |
| dG'(0.5-10) [MPa] | 0.59 | 1.13 | 13.5 |
| dG'(0.5-10)/G'(9) | 42% | 17% | 211% |
| G' (9%) [MPa] | 1.39 | 6.52 | 6.41 |
| Tan d (9%) [—] | 0.098 | 0.067 | 0.301 |
| G' (3%) [MPa] | 1.42 | 6.93 | 8.52 |
| Tan d (3%) [—] | 0.113 | 0.056 | 0.371 |

Key: SBR 2525: containing 25% of vinyl on total monomers; IR: Synthetic polyisoprene by Nizhnekamskneftekhim; Silica 1165: Zeosil 1165 by Rhodia; TMMS: trimethoxypropyl methacrylsilane Sigma Aldrich; SIL-TMMS-MAPOSS10: derivatised silica prepared in Example 3°; N375: carbon black by Birla Carbon; Stearic acid:

Stearina TP8 by Undesa; 6PPD: N-(1,3-dimethylbutyl)-N'-phenyl-p-phenylenediamine Santoflex-6 PPD by Eastman; Reactive phenolic resin: DUREZ 12686 by Sumitomo Bakelite Europe NV; ZnO: zinc oxide by Zincol Ossidi; DCP: dicumyl peroxide by Arkema; 65% HMMM: hexamethoxymethylmelamine (65%) on an inert support, Cyrez 964 P.C.; TBBS: N-tert-butyl-2-benzothiazilsulphenamide, Vulkacit® NZ/EGC, Lanxess; Sulphur: Redball Superfine, International Sulphur Inc; G' (3%) and G' (9%) represent the shear moduli measured at 70° C., 10 Hz at 3% and 9% of dynamic deformation; dG' (0.5-10) indicates the difference between the shear modulus at 0.5% and 10% of dynamic deformation measured at 10 Hz, 70° C. with a Monsanto R.P.A. 2000; Tan d (Tan delta) represents the value of the ratio between G' and G" recorded at 10 Hz, 70° C. at a deformation of 3% and 9%; dG' (0.5-10)/G'(9) is the dG' value (0.5-10) expressed as a percentage with respect to the dynamic shear modulus value measured at 9%, an index of the extent of the Payne effect with respect to the rigidity of the blend.

As can be seen from the results of the analyses reported in Table 3, the derivatised silica according to the invention imparts a surprisingly high modulus to the elastomeric material (Ex. 4b) with respect to the comparative material (Ex. 4a)—in fact, the G' modulus increases by about 5 times—and even more unexpectedly a significant reduction in hysteresis as evidenced by a decrease of tan d by a factor of about 1.5-2.

Considering the conventional bead material, it can be seen that it has a dynamic modulus at 9%, in line with respect to the sample of the invention of Ex. 4b. This modulus value, obtained by using more than twice the filler (70 phr carbon black vs. 33 phr SIL-TEMS-MAPOSS10), much more vulcanising and hardening phenol-formaldehyde resins, is however to the detriment of the hysteresis of the material itself that is significantly high with respect to that of the sample according to the invention of Ex. 4b (0.301 vs 0.067).

With the reinforcement materials of the invention it was possible to impart high moduli and low hysteresis with the use of smaller amounts of filler and in the absence of phenol-formaldehyde hardening resins. This balance of properties appears to be particularly interesting and predictive for tyre applications where white fillers are already used, such as tread, under-layer, sidewall or sidewall insert, which require low hysteresis.

In addition, the derivatised silica according to the invention, which imparts a considerable reinforcement to the materials that incorporate it, surprisingly allows expanding the application possibilities, namely to use these fillers in small amounts, even in very demanding applications, such as for example bead filler materials, bead protective layers and rigid under-layers, where traditionally large amounts of filler and/or phenol-formaldehyde hardening resins are used.

Considering the high efficacy of the present fillers in raising the modulus values, the man skilled in the art will be able to modulate ad hoc the final effect on the material depending on the application in the tyre, reducing or increasing the incorporated amount thereof, with the undoubted advantage of maintaining the hysteresis acceptable or advantageously reduced.

Example 5

In this example, elastomeric materials according to the invention (Ex. 5c) and comparative (Ex. 5a and 5b) were prepared by adding the silica (C), the silanising reagent (A) (TMMS) and/or the silsesquioxane (B) (MAPOSS) during mixing, without any pre-treatment of the silica (preparation "in-situ").

The following Table 4 shows the components of the elastomeric materials of the comparative Examples 5a and 5b and of Example 5c according to the invention and the respective values of G', dG' and tan Delta measured, according to the above methods, on samples vulcanised at 170° C. for 10 minutes:

TABLE 4

|  | Ex. 5a Comparative SIL + TMMS | Ex. 5b Comparative SIL + MAPOSS | Ex. 5c Invention SIL + TMMS + MAPOSS |
|---|---|---|---|
| Component (amount in phr) |  |  |  |
| SBR 2525 | 100 | 100 | 100 |
| MAPOSS |  | 10 | 10 |
| Silica 1165 | 30 | 30 | 30 |
| TMMS | 2.4 |  | 2.4 |
| Stearic acid | 2 | 2 | 2 |
| 6PPD | 2 | 2 | 2 |
| ZnO | 3.5 | 3.5 | 3.5 |
| DCP | 2 | 2 | 2 |
| Properties |  |  |  |
| dG'(0.5-10) [MPa] | 0.59 | 0.41 | 2.24 |
| dG'(0.5-10)/G'(9) | 42% | 25% | 36% |
| G' (9%) [MPa] | 1.39 | 1.60 | 6.24 |
| Tan d (9%) [—] | 0.098 | 0.102 | 0.149 |
| G' (3%) [MPa] | 1.42 | 1.85 | 7.55 |
| Tan d (3%) [—] | 0.113 | 0.074 | 0.118 |

Key: MAPOSS Octamethacrylpropyl silsesquioxane (Hybrid Plastic MA0735) formula $R=C_7H_{11}O_2$, n=8, 10, 12 (mixture), for other meanings, see the previous key The comparative example 5b shows that the MAPOSS incorporated alone in the elastomeric composition does not lead to a significant reinforcement, especially as regards the hysteresis at 9% of dynamic deformation, which tends to increase.

Conversely the sample according to the invention of example 5c shows that the elastomeric composition in-situ, that is, prepared by incorporation of silica (C), silanising agent A and silsesquioxane (B) in the elastomeric matrix leads to the maintenance (see Tan d at 3%) or to a limited increase (Tan d at 9%) of the hysteresis, associated with a significant increase in the G' modulus (431% and 349%, respectively).

The loss of dynamic modulus with increasing deformation or Payne effect d G' (0.5-10) of the present sample 5b is more significant than it was in the case of the sample of Ex. 4b incorporating the preformed derivatised silica, but it still remains very advantageous (6 times lower) with respect to the loss of module shown by conventional compounds with comparable moduli, such as the bead filler composition, shown in Table 4, comprising much filler, much sulphur and hardening resins.

The comparison of the values of d G' (0.5-10) [MPa] of the samples of Ex. 5c and of the conventional bead material of Table 4 (2.24 vs. 13.5) highlights the unexpected advantageous effect of the reinforcement materials according to the invention on the Payne effect, even in the case of their preparation in-situ.

The loss of dynamic modulus as a function of the deformation compared to the same dynamic modulus dG' (0.5-10)/G'(9) (relative Payne effect) also highlights that with respect to the comparative sample of Ex. 4a (comprising silanised silica but not derivatised with MAPOSS), the sample of Ex. 4b according to the invention is less sensitive to the effect of the dynamic deformation: the reinforcement material according to the invention, regardless of its preparation—in-situ or preformed—leads to a decrease of the relative Payne effect (from 42% to 17%) and an exceptional balance between modulus and hysteresis.

The experiment also confirms that without pre-treating the silica with the silanising reagent (A) (TMMS) and the silsesquioxane (B) but derivatising in-situ during mixing, it is possible to obtain that peculiar balance of the material properties—such as a high modulus associated with an acceptable hysteresis—predictive in excellent performance tyre in all those applications where white fillers are conventionally used, such as tread, under-layer, sidewall, sidewall filler, and also in those that require high moduli such as bead filler, rigid under-layers and bead protective layers.

Example 6

In this example, to investigate the correlation between the amount of MAPOSS and the effect on the material properties of interest, elastomeric materials according to the invention (Ex. 6b, 6c and 6d) were prepared, incorporating equal amounts of derivatised silica but at an increasing content of MAPOSS, prepared as described in Example 3c (SIL-TMMS-MAPOSS3), Example 3b (SIL-TMMS-MAPOSS5) and Example 3a (SIL-TMMS-MAPOSS10), respectively.

As a comparison, the comparative material of Example 6a was prepared, in which silica and the silanising agent TMMS were added during the mixing (in-situ), in the absence of MAPOSS.

The following Table 5 shows the components of the elastomeric materials of the comparative Example 6a and of Examples 6b, 6c, 6d of the invention and the respective values of G', dG' and tan Delta measured, according to the above methods, on samples vulcanised at 170° C. for 10 minutes:

TABLE 5

| | Ex. 6a Comparative SIL + TMMS | Ex. 6b Invention SIL-TMMS-MAPOSS3 | Ex. 6c Invention SIL-TMMS-MAPOSS5 | Ex. 6d Invention SIL-TMMS-MAPOSS10 | Conventional tread composition |
|---|---|---|---|---|---|
| Component (amount in phr) | | | | | |
| SLR 4630 | 100 | 100 | 100 | 100 | 100 |
| SIL-TMMS-MAPOSS3 | | 33 | | | |
| SIL-TMMS-MAPOSS5 | | | 33 | | |
| SIL-TMMS-MAPOSS10 | | | | 33 | |
| Silica 1165 | 30 | | | | 65 |
| TESPT | | | | | 5.2 |
| TMMS | 2.4 | | | | |
| Stearic acid | 2 | 2 | 2 | 2 | 2 |
| 6PPD | 2 | 2 | 2 | 2 | 2 |
| ZnO | 3.5 | 3.5 | 3.5 | 3.5 | 2 |
| DCP | 2 | 2 | 2 | 2 | |
| Sulphur | | | | | 1 |
| TBBS | | | | | 3 |
| Properties | | | | | |
| dG'(0.5-10) [MPa] | 0.071 | 0.133 | 0.215 | 0.311 | 1.36 |
| dG'(0.5-10)/G'(9) | 12% | 15% | 19% | 20% | 90% |
| G' (9%) [MPa] | 0.58 | 0.90 | 1.15 | 1.54 | 1.51 |
| Tan d (9%) [—] | 0.070 | 0.074 | 0.077 | 0.077 | 0.166 |
| G' (3%) [MPa] | 0.61 | 0.97 | 1.24 | 1.67 | 1.72 |
| Tan d (3%) [—] | 0.070 | 0.074 | 0.076 | 0.065 | 0.194 |

Key: SLR 4630SBR Styron: containing 47% of vinyl on total monomers

As can be seen in the Table, with the same hysteresis, a significant increase in the modulus values is already observed for a minimum load of MAPOSS. In fact, by comparing the material of Example 6b, comprising 33 phr of SIL-TMMS-MAPOSS3 with the reference material of Example 6a, it is observed that the modulus already increases from 0.578 to 0.903 (G' at 9%) and from 0.612 to 0.967 (G° at 3%), with a relative percentage increase of about 56% and 58%, respectively.

The increase in the modulus proves even more significant with the increase of the amount of MAPOSS loaded (see Examples 6c and 6d) and the maintaining or reduction of the hysteresis is confirmed at the same time.

Figure 2:
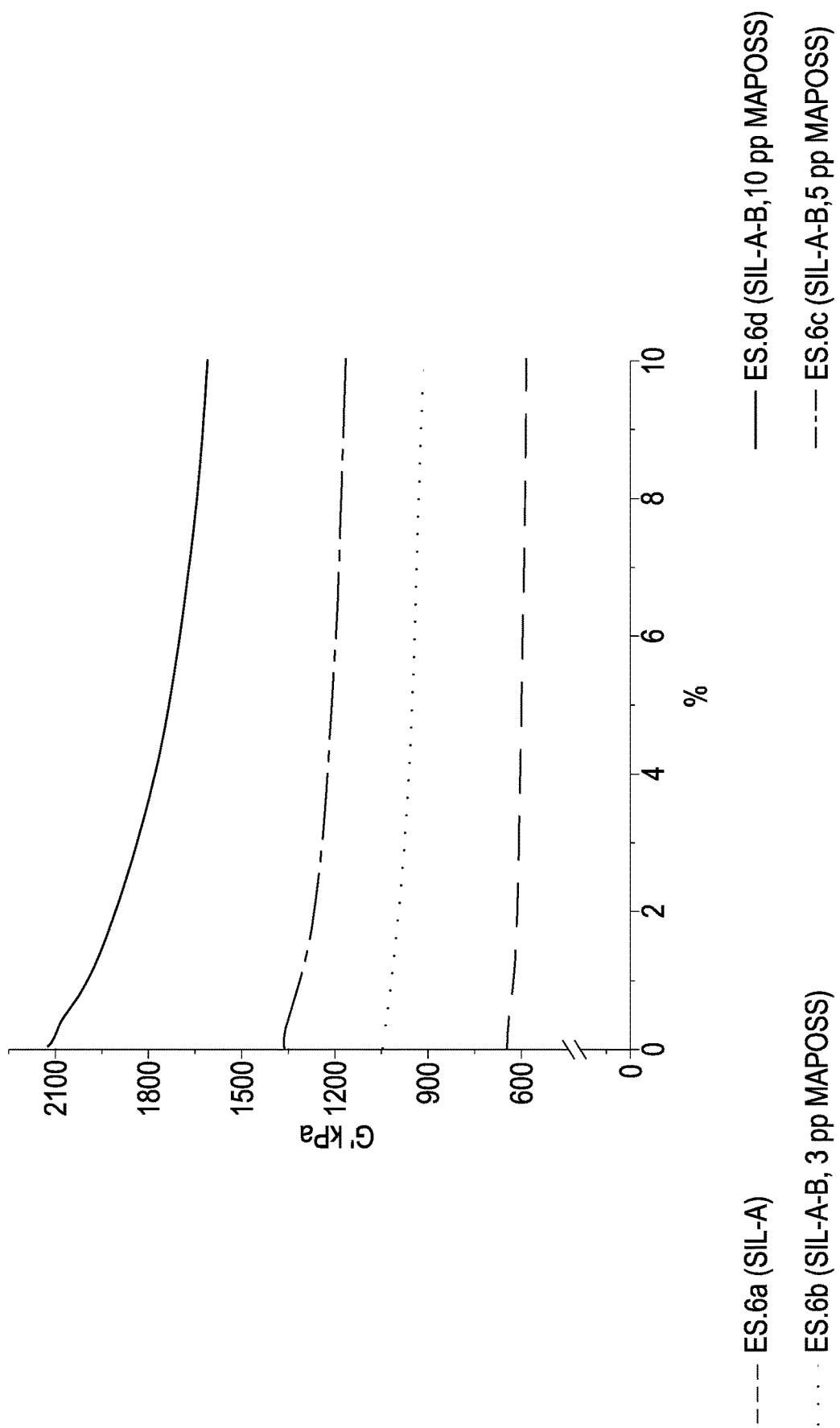
FIG. 2 shows the graphs of moduli G' with increasing strain of samples of vulcanised elastomeric compositions of the invention comprising derivatised silica (SIL-A-B) with different contents of B (Ex. 6b-6d) with respect to a comparative sample comprising silanised silica alone (SIL-A) (Ex, 6a).

As shown in FIG. 2 by the pattern of four curves, there appears to be a direct proportionality between the amount of MAPOSS loaded and the extent of the measured reinforcement.

In conclusion, this experiment showed that even with rather small amounts of MAPOSS it is possible to obtain that peculiar balancing of properties—such as high modulus associated with an acceptable hysteresis—characteristic of the materials according to the invention.

In this case, the Payne effect increases slightly, but remains lower than that of a typical read composition with comparable modulus G', shown in the last column, and characterized by more than double hysteresis (Tan delta 0.194 vs 0.065 of the sample of Ex. 6d) and a quadrupled Payne effect (dG' 1.36 vs 0.0.311).

Example 7

This example assessed the effect of the vulcanising system on the effectiveness of the present reinforcement materials, when incorporated into elastomeric materials vulcanised with the vulcanisation system sulphur/CBS most commonly used in elastomeric compounds for tyres rather than with peroxides (DCP) as in the previous examples.

To this end, elastomeric materials according to the invention were prepared, incorporating silica, TMMS and MAPOSS (derivatisation in-situ, Ex. 7b) and comparable amounts of pre-derivatised silica SIL-TMMS-MAPOSS10, prepared as in Example 3d (Ex. 7c), respectively.

As a comparison, the comparative material of Example 7a was prepared, in which silica and the silanising agent TMMS were added during the mixing (in-situ), in the absence of MAPOSS. All samples were vulcanised by the conventional CBS/S system.

The following Table 6 shows the components of the elastomeric materials of the comparative Example 7a and of Examples 7b and 7c of the invention and the respective values of G', dG' and tan Delta measured, according to the above methods, on samples vulcanised at 170° C. for 10 minutes:

TABLE 6

|  | Ex. 7a Comparative SIL + TMMS | Ex. 7b Invention SIL + TMMS + MAPOSS | Ex. 7c Invention SIL-TMMS-MAPOSS |
|---|---|---|---|
| Component (amount in phr) |  |  |  |
| SLR 4630 | 100 | 100 | 100 |
| MAPOSS |  | 10 |  |
| SIL-TMMS-MAPOSS10 |  |  | 33 |
| Silica 1165 | 30 | 30 |  |
| TMMS | 2.4 | 2.4 |  |
| Stearic acid | 2 | 2 | 2 |
| 6PPD | 2 | 2 | 2 |
| ZnO | 3.5 | 3.5 | 3.5 |
| CBS | 3 | 3 | 3 |
| Sulphur | 1 | 1 | 1 |
| Properties |  |  |  |
| dG'(0.5-10) [MPa] | 0.101 | 0.128 | 0.365 |
| dG'(0.5-10)/G'(9) | 17% | 14% | 28% |
| G' (9%) [MPa] | 0.61 | 0.94 | 1.32 |
| Tan d (9%) [—] | 0.070 | 0.073 | 0.111 |
| G' (3%) [MPa] | 0.65 | 0.99 | 1.49 |
| Tan d (3%) [—] | 0.069 | 0.073 | 0.106 |

Key: CBS: N-cyclohexyl-2-benzothiazyl sulphenamide (accelerant) Vulkacit® CZ/C—(Lanxess) for other meanings, see previous keys.

As can be seen in Table 6, even changing the vulcanisation system, the trend observed in the previous tests is maintained, that is, for a modest increase in hysteresis, a significant increase in the modulus values is observed. In fact, considering for example the sample of Example 7b with respect to that of Example 7a, it appears that the modulus increases by about 53-54% with virtually constant hysteresis. Wanting to increase in a similar manner the modulus of these materials with conventional fillers of the silica or silanised silica type, one should greatly increase the incorporated amount and a significant simultaneous increase in the hysteresis would be observed at the same time. Even in the case of the material of Example 7c, the modulus increase is much higher than the hysteresis, for example by considering the values at 9%, it is observed that with respect to the reference sample of Example 7a, G' (at 9%) increases by 116%, while the tan d by only 59%, confirming the unexpected trend imparted by the reinforcement materials according to the invention to the modulus and hysteresis properties.

Figure 3:
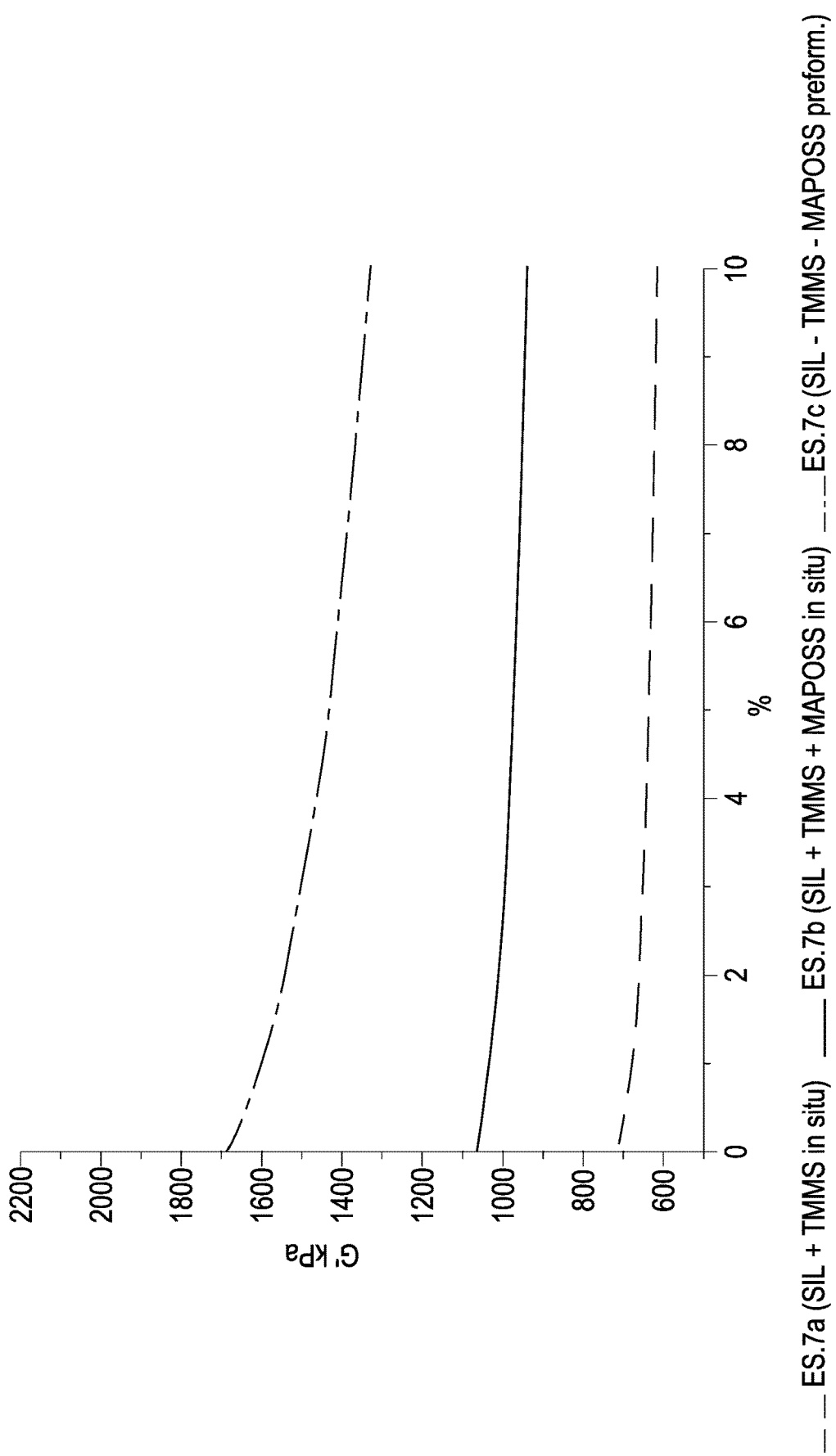
FIG. 3 shows the graphs of moduli G' with increasing strain of samples of vulcanised elastomeric compositions with &CBS (Ex. 7a, 7b and 7c).

As is shown in FIG. 3, the modulus of the samples according to the invention (Ex. 7b and 7c) is visibly higher than the standards and in absolute value in the range of values required for the majority of applications in tyres, such as treads, under-layers, sidewalls and sidewall insert. It follows that by reducing the incorporated amount of reinforcement material according to the invention, it is possible to obtain materials with moduli still suitable for use, at the same time characterised by particularly low hysteresis at 70° C.

Example 8

In this example, the reinforcement material according to the invention (Ex. 8b), prepared in-situ by mixing elastomer, silica, TEMS and MAPOSS10, was compared with the comparative reinforcement material (Ex. 8a) prepared under the same conditions but with a different silanising agent, TESPT, which does not include reactive alkenyl functionalities according to the invention. This comparative example follows the teaching of the prior art, in particular of documents U.S. Pat. No. 9,085,676 and J. Nanomaterials vol. 2013, ID 674237.

The following Table 7 shows the components of the elastomeric materials of the comparative Example 8a and of Example 8b of the invention and the respective values of G', dG' and tan Delta measured, according to the above methods, measured on samples vulcanised at 170° C. for 10 minutes:

TABLE 7

|  | Ex. 8a Comparative SIL + TESPT + MAPOSS10 | Ex. 8b Invention SIL + TEMS + MAPOSS10 |
|---|---|---|
| Component (amount in phr) |  |  |
| SLR 4630 | 100 | 100 |
| Silica 1165 | 30 | 30 |
| MAPOSS10 | 10 | 10 |
| TEMS |  | 2.4 |
| TESPT | 2.4 |  |
| Stearic ac. | 2.0 | 2.0 |

TABLE 7-continued

|  | Ex. 8a Comparative SIL + TESPT + MAPOSS10 | Ex. 8b Invention SIL + TEMS + MAPOSS10 |
|---|---|---|
| ZnO | 3.5 | 3.5 |
| 6PPD | 2.0 | 2.0 |
| DCP | 2.0 | 2.0 |
| Properties |  |  |
| dG' (0.5-10) [MPa] | 0.928 | 0.294 |
| G' (9%) [MPa] | 1.530 | 1.676 |
| Tan d (9%) [—] | 0.152 | 0.084 |
| G' (3%) [MPa] | 1.822 | 1.874 |
| Tan d (3%) [—] | 0.146 | 0.071 |

Key: TESPT: bis[3-(triethoxysilyl)propyl]tetrasulphide, for other meanings, see previous keys.

As can be seen in Table 7, with the same or even greater moduli, the sample according to the invention shows values of hysteresis and dG' significantly lower than the comparative sample, confirming the importance of the presence of the reactive alkenyl function both on the silanising agent (A) and on the silsesquioxane (B). In fact, the comparative example 8a, in which the silanising agent is devoid of such a reactive function, leads to visibly inferior results.

Figure 4A:
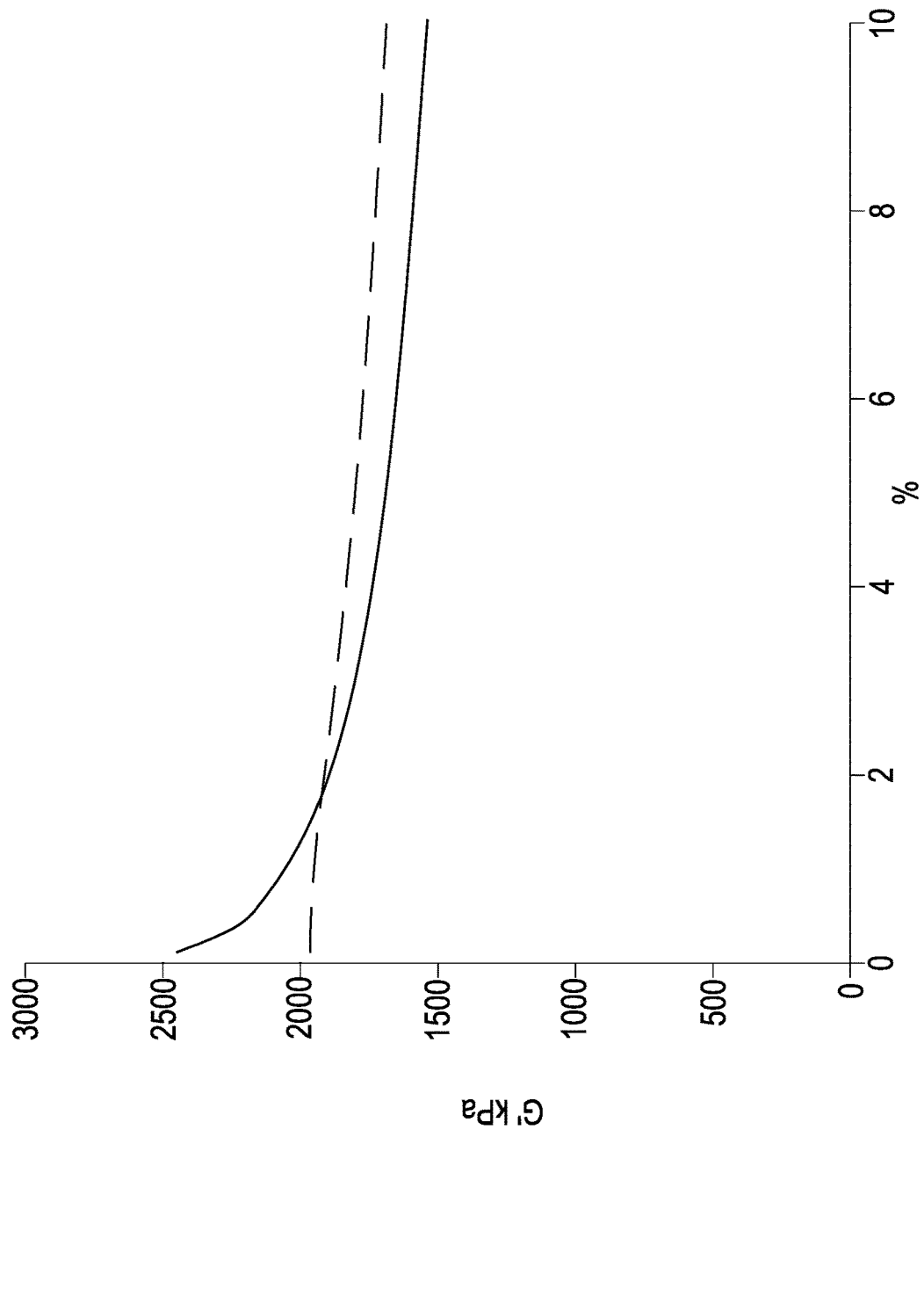
FIGS. 4a and 4b show the graphs of moduli G' and of hysteresis of the samples of vulcanised elastomeric compositions of examples 8a (comparative) and 8b (invention), respectively.
Figure 4B:

The diagrams in FIGS. 4a (comparison of moduli) and 4b (comparison of hysteresis) even better highlight the surprising effect of the present reinforcement materials, obtained due to the coupling of a silanising agent (A) and a POSS (B) both substituted with reactive alkenyl functions according to the invention.

Example 9

In this example, the effect of the reinforcement materials according to the invention (Ex. 9c) and comparative (Ex. 9a and 9b) was evaluated in elastomeric compositions comprising polyisoprene and polybutadiene, elastomers commonly used in tyre tread compositions of heavy vehicles, as well as in many other non-tread compositions, such as sidewalls, bead protective layers, sidewall insert, underlayer, bead filler, rubber compounds in all types of tyres. In the polyisoprene and polybutadiene elastomers, vinyl groups are substantially absent.

The following Table 8 shows the components of the elastomeric materials of the comparative Example 9a and 9b and of Example 9c of the invention, the respective rheometric parameters measured on the green samples, the respective filling values at different elongation and break levels, of dynamic modulus E' and tan delta, and of G', dG' and tan delta, measured on samples vulcanised at 170° C. for 15 minutes according to the above methods:

TABLE 8

| Component (amount in phr) | Ex. 9a Comparative SIL + TEMS | Ex. 9b Comparative SIL + TEMS | Ex. 9c Invention SIL + TEMS + MAPOSS |
|---|---|---|---|
| Polyisoprene | 50 | 50 | 50 |
| Poly-butadiene | 50 | 50 | 50 |
| MAPOSS |  |  | 4 |
| Silica 1165 | 40 | 50 | 40 |
| TEMS | 3.2 | 4.0 | 3.2 |
| Stearic acid | 2 | 2 | 2 |
| 6PPD | 2 | 2 | 2 |
| ZnO | 3.5 | 3.5 | 3.5 |
| Peroxide | 2.3 | 2.3 | 2.3 |
| Properties |  |  |  |
| ML | 3.96 | 5.91 | 2.80 |
| MH | 20.6 | 27.2 | 27.5 |
| Ts2 | 1.31 | 1.13 | 1.03 |
| T60 | 6.12 | 6.06 | 5.15 |
| T90 | 13.84 | 13.65 | 13.33 |
| CA1 | 1.57 | 2.07 | 2.48 |
| CA3 | 6.27 | 8.1 | 9.67 |
| CR | 17.9 | 18.3 | 15.9 |
| E' 23° C. 100 Hz 3.5% | 9.23 | 12.97 | 15.38 |
| E' 70° C. 100 Hz 3.5% | 7.99 | 10.96 | 12.78 |
| Tan d 23° C. 100 Hz 3.5% | 0.127 | 0.139 | 0.121 |
| Tan d 70° C. 100 Hz 3.5% | 0.098 | 0.105 | 0.093 |
| MDR 20/170 |  |  |  |
| dG'(0.5-10) [MPa] | 0.93 | 2.13 | 1.02 |
| dG'(0.5-10)/G'(9) | 60% | 82% | 47% |
| G' (9%) [MPa] | 1.56 | 2.60 | 2.16 |
| Tan d (9%) [—] | 0.166 | 0.161 | 0.150 |
| G' (3%) [MPa] | 2.11 | 3.84 | 2.67 |
| Tan d (3%) [—] | 0.142 | 0.126 | 0.132 |

Key: Polyisoprene: SKI3 by Nizhnekamskneftekhim; Polybutadiene: Polybutadiene BR40 by Versalis; Peroxide: 2,5-bis(t-butylperoxy)-2,5-dimethyl hexane at 45% active on silica, Luperox 101KL45 by Arkema, for other meanings see previous keys.

As can be seen from the comparison between the two comparative examples 9a and 9b, by increasing the amount of silica and TEMS associated with it, there is an increase of both static and dynamic moduli, together with a significant increase in the Payne effect, both in absolute terms (0.93 to 2.13) and in relative terms (60% to 82%).

In the material of Example 9b, filler with a larger amount of silica, the hysteresis measured at 100 Hz in compression increases, remains substantially constant at 9% of dynamic shear deformation while it decreases at 3%.

This decrease depends essentially on the greater Payne effect of the latter: with a greater amount of silica, the pattern of the filler itself is stronger and at 3% of dynamic deformation it still brings much elasticity to the material, intended to decrease as the deformation increases. It should also be noted that as the amount of silica increases, the viscosity of the composition strongly increases, which is reflected in the 49% increase of the ML value, from sample 9a to 9b.

The composition of Ex. 9c differs from the reference composition of Ex. 9a only by 4 phr of MAPOSS more, while that of Ex. 9b, in addition to the 4 phr of MAPOSS more, also by 10 phr of silica and 0.8 phr of TEMS less.

The material of the invention of Ex. 9c has a higher static modulus and dynamic modulus not only than those of the most similar reference material 9a but also with respect to the reference material 9b, despite this contains more filler and therefore, predictably, has a higher modulus due to the larger content of the same.

In particular, the filler values at 100% and 300% of elongation (CA1 and CA3) of the material according to the invention 9c are higher than those of the reference 9a by 58% and 54%.

The dynamic compression moduli E' at 23° C. and 70° C. are higher by 66% and 59% for material 9c, respectively, when compared with those of reference 9a.

The same dynamic compression moduli E' of the material according to the invention 9c are also higher than those of the material with more filler 9b (18% at 23° C. and 16% at 70° C.).

The most interesting data shown by the elastomeric composition 9c according to the invention is that the increase in the modulus is associated with a decrease in the hysteresis and Payne effect, especially evident in relative terms. In fact, material 9c shows a 47% relative loss of the modulus between 0.5% and 10% deformation, while the reference material 9a shows a 60% loss and the reference material with increased filler 9b shows a 82% loss.

It should also be noted that material 9c according to the invention maintains good load at break values CR, albeit lower than those of the reference compositions 9a and 9b, predictable in much stiffer compositions, but especially shows a low viscosity, which is reflected in a lower ML value not only to the material that is closer in terms of mechanical properties 9b (ML less than half), but also of material 9a (ML lower than 41%).

The invention claimed is:

1. A process for preparing derivatised silica (SIL-A-B) comprising:
    providing silanised silica (SIL-A), wherein the silanised silica (SIL-A) is made by a process comprising:
        providing silica (C),
        providing at least one silanising agent of formula (A),

(R1)$_3$Si—X  (A)

wherein
            R1, the same or different from each other, are chosen from R2, OR2, OSi(OR2)$_3$, OH, halogen, and group X, provided that at least one R1 is equal to OR2, OSi(OR2)$_3$, OH, or halogen;
            R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;
            group X is a reactive alkenyl group chosen from X1, X2, and X3, wherein
                X1 is a group —R3-C(Wa)=C(R4)R4,
                X2 is a group —R3-C(R4)=C(Wa)R4, and
                X3 is a group —R3-Wb-C(R4)=C(R4)R4,
                wherein
                    R3 is absent or is chosen from linear and branched alkylene groups with 1 to 10 carbon atoms,
                    Wa is H or an electron-attractor group chosen from COOR4, CONR4R4, NO$_2$, CN, COR4, SO$_3$R4, NR4R4, and halogen,
                    Wb is a group chosen from —O—CO—, —COO—, —NR4-CO—, —CO—NR4-, —SO—, —SO$_2$—, and —CO—, and
                    R4, the same or different from each other, are H or are chosen from the groups R2 defined above,
        placing the silica (C) and the silanising agent (A) in contact in a first reaction medium,
        allowing the silica (C) and the silanising agent (A) to react until the silanised silica (SIL-A) is obtained, and
        separating the silanised silica (SIL-A) from the first reaction medium;
    placing the silanised silica (SIL-A) in contact, in a second reaction medium, with at least one compound of formula (B) chosen from the silsesquioxanes of formula (B1), (B2), the compounds of formula (B3), and mixtures thereof,

(RSiO$_{1.5}$)$_n$  (B1)

(RSiO$_{1.5}$)$_x$[RSi(OR4)O]$_y$  (B2)

[RSi(OH)O]$_{3-4}$  (B3)

wherein
        n is an even number ranging from 4 to 24,
        x is an integer ranging from 3 to 23, y is an integer ranging from 1 to 6, and x+y≤24, and
        groups R, the same or different from each other, are chosen from R2 and X,
            provided that at least one of groups R is a group X, wherein R2, R4 and X are as defined above;
    adding at least one radical initiator (D) to the second reaction medium; and
    allowing the silanised silica (SIL-A), the at least one compound of (B), and the at least one radical initiator (D) to react until a derivatised silica (SIL-A-B) is obtained.

2. The process according to claim 1, wherein the R3 of group X is chosen from unsaturated alkylene groups.

3. The process according to claim 1, wherein an acid catalyst is placed in the first reaction medium in contact with the silica (C) and the silanising agent (A).

4. The process according to claim 1, wherein the at least one silanising agent is a compound of formula (A),

(R1)$_3$Si—X  (A)

wherein
        R1, the same or different from each other, are chosen from R2 and OR2, and R2 is chosen from linear and branched alkyl groups with 1 to 3 carbon atoms;
        group X is a reactive alkenyl group X3 as defined above, wherein R3 is an alkylene group with 2 to 5 carbon atoms, Wb is a group —O—CO— and R4, the same or different from each other, are chosen from H and alkyl groups with 1 to 3 carbon atoms.

5. The process according to claim 1, wherein the compound of formula (B) is a closed cage silsesquioxane of formula (B1)

(RSiO$_{1.5}$)$_n$  (B1)

wherein n is an even number ranging from 6 to 12, and
        all groups R are reactive groups X3 as defined above, wherein R3 is an alkylene group with 2 to 5 carbon atoms, Wb is a group —O—CO— and R4, the same or different from each other, are chosen from H and alkyl groups with 1 to 3 carbon atoms, or
        all groups R are reactive groups X1 as defined above, wherein R3 is absent, and Wa and R4 are all H.

6. The process according to claim 1, wherein the silica (C) is an amorphous precipitated silica.

7. The process according to claim 1, wherein the silanising agent (A) is used in a weight ratio, with respect to silica (C), ranging from 0.05:1 to 1:1.

8. The process according to claim 1, wherein when preparing the silanised silica (SIL-A), an acid catalyst is used.

9. The process according to claim 1, wherein the at least one compound of formula (B) is used in a weight ratio, with respect to the silanised silica (SIL-A), ranging from 0.03:1 to 1:1.

10. The process according to claim 1, wherein the radical initiator (D) is chosen from the class of organic peroxide initiators or from the class of azo compounds.

11. The process according to claim 1, wherein the first and the second reaction mediums comprise an organic solvent chosen from toluene and one or more alcohols.

12. The process according to claim 11, wherein the organic solvent is mixed with water.

13. A derivatised silica (SIL-A-B) made by a process comprising:
providing silanised silica (SIL-A), wherein the silanised silica (SIL-A) is made by a process comprising:
providing silica (C),
providing at least one silanising agent of formula (A), $$(R1)_3Si—X \quad (A)$$

wherein
R1, the same or different from each other, are chosen from R2, OR2, OSi(OR2)$_3$, OH, halogen, and group X, provided that at least one R1 is equal to OR2, OSi(OR2)$_3$, OH, or halogen;
R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;
group X is a reactive alkenyl group chosen from X1, X2, and X3, wherein
X1 is a group —R3-C(Wa)=C(R4)R4,
X2 is a group —R3-C(R4)=C(Wa)R4, and
X3 is a group —R3-Wb-C(R4)=C(R4)R4,
wherein
R3 is absent or is chosen from linear and branched alkylene groups with 1 to 10 carbon atoms,
Wa is H or an electron-attractor group chosen from COOR4, CONR4R4, NO$_2$, CN, COR4, SO$_3$R4, NR4R4, and halogen,
Wb is a group chosen from —O—CO—, —COO—, —NR4-CO—, —CO—NR4-, —SO—, —SO$_2$—, and —CO—, and
R4, the same or different from each other, are H or are chosen from the groups R2 defined above;
placing the silica (C) and the silanising agent (A) in contact in a first reaction medium,
allowing the silica (C) and the silanising agent (A) to react until the silanised silica (SIL-A) is obtained, and
separating the silanised silica (SIL-A) from the first reaction medium;
placing the silanised silica (SIL-A) in contact, in a second reaction medium, with at least one compound of formula (B) chosen from the silsesquioxanes of formula (B1), (B2), the compounds of formula (B3), and mixtures thereof, $$(RSiO_{1.5})_n \quad (B1)$$

$$(RSiO_{1.5})_x[RSi(OR4)O]_y \quad (B2)$$

$$[RSi(OH)O]_{3-4} \quad (B3)$$

wherein
n is an even number ranging from 4 to 24,
x is an integer ranging from 3 to 23, y is an integer ranging from 1 to 6, and x+y≤24, and
groups R, the same or different from each other, are chosen from R2 and X,
provided that at least one of groups R is a group X, wherein R2, R4 and X are as defined above;
adding at least one radical initiator (D) to the second reaction medium; and
allowing the silanised silica (SIL-A), the at least one compound of (B), and the at least one radical initiator (D) to react until a derivatised silica (SIL-A-B) is obtained.

14. The derivatised silica (SIL-A-B) according to claim 13, wherein the at least one compound of formula (B) is present in an amount, expressed as a percentage by weight with respect to the starting silica weight (C), equal to at least 3%.

15. An elastomeric composition comprising:
at least 100 phr of at least one solid diene elastomeric polymer (E), and
at least 3 phr of a derivatised silica (SIL-A-B) made by a process comprising:
providing silanised silica (SIL-A), the silanised silica made by a process comprising:
providing silica (C),
providing at least one silanising agent of formula (A), $$(R1)_3Si—X \quad (A)$$

wherein
R1, the same or different from each other, are chosen from R2, OR2, OSi(OR2)$_3$, OH, halogen, and group X, provided that at least one R1 is equal to OR2, OSi(OR2)$_3$, OH, or halogen;
R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;
group X is a reactive alkenyl group chosen from X1, X2, and X3, wherein
X1 is a group —R3-C(Wa)=C(R4)R4,
X2 is a group —R3-C(R4)=C(Wa)R4, and
X3 is a group —R3-Wb-C(R4)=C(R4)R4,
wherein
R3 is absent or is chosen from linear and branched alkylene groups with 1 to 10 carbon atoms,
Wa is H or an electron-attractor group chosen from COOR4, CONR4R4, NO$_2$, CN, COR4, 3O$_3$R4, NR4R4, and halogen, Wb is a group chosen from —O—CO—, —COO—, —NR4-CO—, —CO—NR4-, —SO—, —SO$_2$—, and —CO—, and R4, the same or different from each other, are H or are chosen from the groups R2 defined above;

placing the silica (C) and the silanising agent (A) in contact in a first reaction medium, allowing the silica (C) and the silanising agent (A) to react until the silanised silica (SIL-A) is obtained, and separating the silanised silica (SIL-A) from the first reaction medium;

placing the silanised silica (SIL-A) in contact, in a second reaction medium, with at least one compound of formula (B) chosen from the silsesquioxanes of formula (B1), (B2), the compounds of formula (B3), and mixtures thereof,

  (B1)

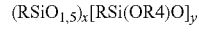  (B2)

  (B3)

wherein
n is an even number ranging from 4 to 24,
x is an integer ranging from 3 to 23, y is an integer ranging from 1 to 6, and x+y≤24, and
groups R, the same or different from each other, are chosen from R2 and X,
provided that at least one of groups R is a group X,
wherein R2, R4 and X are as defined above;
adding at least one radical initiator (D) to the second reaction medium; and
allowing the silanised silica (SIL-A), the at least one compound of (B), and the at least one radical initiator (D) to react until a derivatised silica (SIL-A-B) is obtained.

16. An elastomeric composition comprising:
at least 100 phr of at least one solid diene elastomeric polymer (E);
at least 5 phr of silica (C);
at least 0.3 phr of a silanising agent of formula (A),

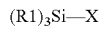  (A)

wherein
R1, the same or different from each other, are chosen from R2, OR2, OSi(OR2)$_3$, OH, halogen, and group X, provided that at least one R1 is equal to OR2, OSi(OR2)$_3$, OH, or halogen;
R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;
group X is a reactive alkenyl group chosen from X1, X2, and X3, wherein
X1 is a group —R3-C(Wa)=C(R4)R4,
X2 is a group —R3-C(R4)=C(Wa)R4, and
X3 is a group —R3-Wb-C(R4)=C(R4)R4, wherein
R3 is absent or is chosen from linear and branched alkylene groups with 1 to 10 carbon atoms,
Wa is H or an electron-attractor group chosen from COOR4, CONR4R4, NO$_2$, CN, COR4, SO$_3$R4, NR4R4, and halogen,
Wb is a group chosen from —O—CO—, —COO—, —NR4-CO—, —CO—NR4-, —SO—, —SO$_2$—, and —CO—, and
R4, the same or different from each other, are H or are chosen from the groups R2 defined above; and
at least 0.5 phr of a compound of formula (B), wherein formula (B) is chosen from the silsesquioxanes of formula (B1), (B2), the compounds of formula (B3), and mixtures thereof,

  (B1)

  (B2)

  (B3)

wherein
n is an even number ranging from 4 to 24,
x is an integer ranging from 3 to 23, y is an integer ranging from 1 to 6, and x+y≤24, and
groups R, the same or different from each other, are chosen from R2 and X,
provided that at least one of groups R is a group X,
wherein R2, R4 and X are as defined above.

17. The elastomeric composition according to claim 16, comprising:
at least 100 phr of at least one solid diene elastomeric polymer (E),
5 to 60 phr of silica (C),
0.5 to 10 phr of silanising agent of formula (A), and
1 to 30 phr of at least one compound of formula (B).

18. A vulcanisable elastomeric composition for a tyre for vehicle wheels, comprising:
at least 0.1 phr of at least one vulcanising agent (F); and
an elastomeric composition comprising at least 100 phr of at least one solid diene elastomeric polymer (E) and at least 3 phr of a derivatised silica (SIL-A-B) made by a process comprising:
providing silanised silica (SIL-A), the silanised silica made by a process comprising:
providing silica (C),
providing at least one silanising agent of formula (A),

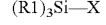  (A)

wherein
R1, the same or different from each other, are chosen from R2, OR2, OSi(OR2)$_3$, OH, halogen, and group X, provided that at least one R1 is equal to OR2, OSi(OR2)$_3$, OH, or halogen;
R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;

group X is a reactive alkenyl group chosen from X1, X2, and X3, wherein

X1 is a group —R3-C(Wa)=C(R4)R4,

X2 is a group —R3-C(R4)=C(Wa)R4, and

X3 is a group —R3-Wb-C(R4)=C(R4)R4, wherein

R3 is absent or is chosen from linear and branched alkylene groups with 1 to 10 carbon atoms, Wa is H or an electron-attractor group chosen from COOR4, CONR4R4, $NO_2$, CN, COR4, $SO_3$R4, NR4R4, and halogen, Wb is a group chosen from —O—CO—, —COO—, —NR4-CO—, —CO—NR4-, —SO—, —$SO_2$—, and —CO—, and R4, the same or different from each other, are H or are chosen from the groups R2 defined above;

placing the silica (C) and the silanising agent (A) in contact in a first reaction medium, allowing the silica (C) and the silanising agent (A) to react until the silanised silica (SIL-A) is obtained, and separating the silanised silica (SIL-A) from the first reaction medium;

placing the silanised silica (SIL-A) in contact, in a second reaction medium, with at least one compound of formula (B) chosen from the silsesquioxanes of formula (B1), (B2), the compounds of formula (B3), and mixtures thereof, $(RSiO_{1.5})_n$ (B1)

$(RSiO_{1.5})_x[RSi(OR4)O]_y$ (B2)

$[RSi(OH)O]_{3-4}$ (B3)

wherein n is an even number ranging from 4 to 24, x is an integer ranging from 3 to 23, y is an integer ranging from 1 to 6, and x+y≤24, groups R, the same or different from each other, are chosen from R2 and X, provided that at least one of groups R is a group X, wherein R2, R4 and X are as defined above;

adding at least one radical initiator (D) to the second reaction medium; and allowing the silanised silica (SIL-A), the at least one compound (B), and the at least one radical initiator (D) to react until a derivatised silica (SIL-A-B) is obtained.

19. A tyre component for vehicle wheels, either green or at least partially vulcanised, comprising a vulcanisable elastomeric composition comprising:

at least 0.1 phr of at least one vulcanising agent (F); and an elastomeric composition comprising at least 100 phr of at least one solid diene elastomeric polymer (E), and at least 3 phr of a derivatised silica (SIL-A-B) made by a process comprising:

providing silanised silica (SIL-A), the silanised silica made by a process comprising:

providing silica (C), providing at least one silanising agent of formula (A), $(R1)_3Si—X$ (A)

wherein

R1, the same or different from each other, are chosen from R2, OR2, $OSi(OR2)_3$, OH, halogen, and group X, provided that at least one R1 is equal to OR2, $OSi(OR2)_3$, OH, or halogen;

R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;

group X is a reactive alkenyl group chosen from X1, X2, and X3, wherein

X1 is a group —R3-C(Wa)=C(R4)R4,

X2 is a group —R3-C(R4)=C(Wa)R4, and

X3 is a group —R3-Wb-C(R4)=C(R4)R4, wherein

R3 is absent or is chosen from linear and branched alkylene groups with 1 to 10 carbon atoms, Wa is H or an electron-attractor group chosen from COOR4, CONR4R4, $NO_2$, CN, COR4, $SO_3$R4, NR4R4, and halogen, Wb is a group chosen from —O—CO—, —COO—, —NR4-CO—, —CO—NR4-, —SO—, —$SO_2$—, and —CO—, and R4, the same or different from each other, are H or are chosen from the groups R2 defined above;

placing the silica (C) and the silanising agent (A) in contact in a first reaction medium, allowing the silica (C) and the silanising agent (A) to react until the silanised silica (SIL-A) is obtained, and separating the silanised silica (SIL-A) from the first reaction medium;

placing the silanised silica (SIL-A) in contact, in a second reaction medium, with at least one compound of formula (B) chosen from the silsesquioxanes of formula (B1), (B2), the compounds of formula (B3), and mixtures thereof, $(RSiO_{1.5})_n$ $(RSiO_{1.5})_x[RSi(OR4)O]_y$ $[RSi(OH)O]_{3-4}$ (B1) (B2) (B3)

wherein n is an even number ranging from 4 to 24, x is an integer ranging from 3 to 23, y is an integer ranging from 1 to 6, and x+y≤24, groups R, the same or different from each other, are chosen from R2 and X, provided that at least one of groups R is a group X, wherein R2, R4 and X are as defined above;

adding at least one radical initiator (D) to the second reaction medium; and allowing the silanised silica (SIL-A), the at least one compound of (B), and the at least one radical initiator (D) to react until a derivatised silica (SIL-A-B) is obtained.

20. The tyre component according to claim 19, wherein the component is chosen from tread, carcass structure, belt structure, under-layer, bead protection layers, sidewall, sidewall insert, mini-sidewall, under-liner, rubber layers, bead filler, and sheet.

21. A tyre for vehicle wheels comprising at least one tyre component, either green or at least partially vulcanized, chosen from tread, carcass structure, belt structure, under-layer, bead protection layers, sidewall, sidewall insert, mini-sidewall, under-liner, rubber layers, bead filler, and sheet, wherein the tyre component comprises a vulcanisable elastomeric composition comprising:

at least 0.1 phr of at least one vulcanising agent (F); and
an elastomeric composition comprising at least 100 phr of at least one solid diene elastomeric polymer (E), and at least 3 phr of a derivatised silica (SIL-A-B) made by a process comprising:
providing silanised silica (SIL-A), the silanised silica being obtainable according to a process which preferably comprises:
providing silica (C),
providing at least one silanising agent of formula (A), $$(R1)_3Si\text{—}X \qquad (A)$$

wherein
R1, the same or different from each other, are chosen from R2, OR2, OSi(OR2)$_3$, OH, halogen, and group X, provided that at least one R1 is equal to OR2, OSi(OR2)$_3$, OH, or halogen;
R2, the same or different from each other, are chosen from linear and branched alkyl groups with 1 to 20 carbon atoms, cycloalkyl groups with 3 to 20 carbon atoms, alkylaryl groups with 7 to 20 carbon atoms, and aryl groups with 6 to 20 carbon atoms;
group X is a reactive alkenyl group chosen from X1, X2, and X3, wherein
X1 is a group —R3-C(Wa)=C(R4)R4,
X2 is a group —R3-C(R4)=C(Wa)R4, and
X3 is a group —R3-Wb-C(R4)=C(R4)R4,
wherein
R3 is absent or is chosen from linear and branched alkylene groups with 1 to 10 carbon atoms, Wa is H or an electron-attractor group chosen from COOR4, CONR4R4, NO$_2$, CN, COR4, SO$_3$R4, NR4R4, and halogen,
Wb is a group chosen from —O—CO—, —COO—, —NR4-CO—, —CO—NR4-, —SO—, —SO$_2$—, and —CO—, and
R4, the same or different from each other, are H or are chosen from the groups R2 defined above;

placing the silica (C) and the silanising agent (A) in contact in a first reaction medium,
allowing the silica (C) and the silanising agent (A) to react until the silanised silica (SIL-A) is obtained, and
separating the silanised silica (SIL-A) from the first reaction medium;
placing the silanised silica (SIL-A) in contact, in a second reaction medium, with at least one compound of formula (B) chosen from the silsesquioxanes of formula (B1), (B2), the compounds of formula (B3), and mixtures thereof, $$(RSiO_{1.5})_n \qquad (B1)$$

$$(RSiO_{1.5})_x[RSi(OR4)O]_y \qquad (B2)$$

$$[RSi(OH)O]_{3\text{-}4} \qquad (B3)$$

wherein
n is an even number ranging from 4 to 24,
x is an integer ranging from 3 to 23, y is an integer ranging from 1 to 6, and x+y≤24,
groups R, the same or different from each other, are chosen from R2 and X,
provided that at least one of groups R is a group X,
wherein R2, R4 and X are as defined above;
adding at least one radical initiator (D) to the second reaction medium; and
allowing the silanised silica (SIL-A), the at least one compound of (B), and the at least one radical initiator (D) to react until a derivatised silica (SIL-A-B) is obtained.

* * * * *